(12) United States Patent
Shearer et al.

(10) Patent No.: US 10,768,784 B2
(45) Date of Patent: Sep. 8, 2020

(54) SYSTEMS AND METHODS FOR RULES-BASED AUTOMATIONS AND NOTIFICATIONS

(71) Applicant: Vivint, Inc., Provo, UT (US)

(72) Inventors: Wade Shearer, Lehi, UT (US); Michael Warner, Payson, UT (US)

(73) Assignee: Vivint, Inc., Provo, UT (US)

(*) Notice: Subject to any disclaimer, the term of this patent is extended or adjusted under 35 U.S.C. 154(b) by 278 days.

(21) Appl. No.: 14/561,675

(22) Filed: Dec. 5, 2014

(65) Prior Publication Data

US 2015/0160797 A1 Jun. 11, 2015

Related U.S. Application Data

(60) Provisional application No. 61/912,989, filed on Dec. 6, 2013.

(51) Int. Cl.
*G06F 3/0482* (2013.01)
*H04L 29/08* (2006.01)
*H04L 12/28* (2006.01)

(52) U.S. Cl.
CPC ........ *G06F 3/0482* (2013.01); *H04L 12/2803* (2013.01); *H04L 12/2816* (2013.01); *H04L 12/2823* (2013.01); *H04L 67/025* (2013.01)

(58) Field of Classification Search
CPC ............... H04L 12/2803; H04L 67/025; H04L 12/2823; H04L 12/2816; G06F 3/0482
See application file for complete search history.

(56) References Cited

U.S. PATENT DOCUMENTS

| | | | | |
|---|---|---|---|---|
| 5,917,489 A | * | 6/1999 | Thurlow | G06Q 10/107 715/809 |
| 5,922,040 A | * | 7/1999 | Prabhakaran | G08G 1/127 340/990 |
| 6,038,451 A | * | 3/2000 | Syed | H04M 3/54 455/417 |
| 6,243,039 B1 | * | 6/2001 | Elliot | G01S 19/16 342/357.74 |
| 6,778,837 B2 | * | 8/2004 | Bade | H04W 12/08 342/457 |

(Continued)

OTHER PUBLICATIONS

Monica Anderson. "Technology Device Ownership: 2015." Pew Research Center, Oct. 2015,Available at: http://www.pewinternet.org/2015/10/29/technology-device-ownership-2015.*

*Primary Examiner* — Justin R. Blaufeld
(74) *Attorney, Agent, or Firm* — Holland & Hart, LLP

(57) ABSTRACT

Methods, systems, and devices are described for improved graphical user interfaces suitable for monitoring and controlling home automation, security, and/or energy management systems. In some embodiments, rules of different types may be displayed in, and controlled from, a list view. The graphical user interface may display a list of rules associated with generic automation rules and context-associated automation rules. List items may be associated with suggested automation rules, notification rules, or both. The list of rule items may include items associated with a property context or an external condition context. Items may be included in the list based, at least in part, on the current property context, the current external condition context, or both. In some instances, the system may be communicatively coupled to a third-party information service.

18 Claims, 18 Drawing Sheets

(56) References Cited

U.S. PATENT DOCUMENTS

| | | | | |
|---|---|---|---|---|
| 6,985,588 B1* | 1/2006 | Glick | G06F 21/10 | 380/258 |
| 7,523,186 B1* | 4/2009 | Waters | G06F 15/173 | 709/203 |
| 7,792,297 B1* | 9/2010 | Piccionelli | H04L 67/18 | 380/258 |
| 7,895,136 B2* | 2/2011 | Slemmer | G05B 13/028 | 706/12 |
| 8,490,006 B1* | 7/2013 | Reeser | G05B 15/02 | 700/18 |
| 8,620,841 B1* | 12/2013 | Filson | G08B 17/10 | 706/12 |
| 9,417,637 B2* | 8/2016 | Matsuoka | H04L 12/2825 | |
| 2002/0137524 A1* | 9/2002 | Bade | H04W 12/08 | 455/456.2 |
| 2002/0184620 A1* | 12/2002 | Davies | H04L 12/2827 | 725/25 |
| 2003/0037110 A1* | 2/2003 | Yamamoto | H04L 51/20 | 709/204 |
| 2003/0040812 A1* | 2/2003 | Gonzales | G05B 11/01 | 700/19 |
| 2003/0105822 A1* | 6/2003 | Gusler | H04L 51/04 | 709/206 |
| 2003/0151501 A1* | 8/2003 | Teckchandani | B60R 25/33 | 340/426.19 |
| 2003/0167308 A1* | 9/2003 | Schran | H04L 63/20 | 709/205 |
| 2003/0188191 A1* | 10/2003 | Aaron | H04L 63/1441 | 726/23 |
| 2003/0188199 A1* | 10/2003 | Tadano | G06F 21/35 | 726/35 |
| 2004/0003071 A1* | 1/2004 | Mathew | H04L 63/083 | 709/223 |
| 2004/0006621 A1* | 1/2004 | Bellinson | G06F 16/9535 | 709/225 |
| 2004/0111479 A1* | 6/2004 | Borden | H04L 12/1813 | 709/206 |
| 2004/0153518 A1* | 8/2004 | Seligmann | H04W 48/20 | 709/206 |
| 2004/0158630 A1* | 8/2004 | Chang | H04L 41/24 | 709/224 |
| 2004/0158631 A1* | 8/2004 | Chang | H04L 41/24 | 709/224 |
| 2004/0186989 A1* | 9/2004 | Clapper | G06F 21/85 | 713/151 |
| 2004/0205194 A1* | 10/2004 | Sahai | G06F 21/50 | 709/228 |
| 2004/0249938 A1* | 12/2004 | Bunch | H04L 43/00 | 709/224 |
| 2004/0254698 A1* | 12/2004 | Hubbard | G08G 1/0104 | 701/32.7 |
| 2004/0260801 A1* | 12/2004 | Li | H04L 63/0227 | 709/223 |
| 2005/0012612 A1* | 1/2005 | Przygoda, Jr. | G06K 17/00 | 340/539.13 |
| 2005/0044404 A1* | 2/2005 | Bhansali | G06F 21/88 | 726/26 |
| 2005/0060738 A1* | 3/2005 | Stecyk | H04N 7/163 | 725/10 |
| 2005/0073443 A1* | 4/2005 | Sheha | G01C 21/3697 | 340/995.1 |
| 2005/0130633 A1* | 6/2005 | Hill | H04M 15/723 | 455/414.1 |
| 2005/0187020 A1* | 8/2005 | Amaitis | G07F 17/32 | 463/42 |
| 2005/0240959 A1* | 10/2005 | Kuhn | H04N 21/4532 | 725/25 |
| 2006/0221173 A1* | 10/2006 | Duncan | H04N 21/6581 | 348/14.02 |
| 2007/0016945 A1* | 1/2007 | Bassett | H04L 63/0263 | 726/11 |
| 2007/0223048 A1* | 9/2007 | Misawa | H04N 1/21 | 358/302 |
| 2008/0191045 A1* | 8/2008 | Harter | G05D 23/1904 | 236/91 D |
| 2009/0213001 A1* | 8/2009 | Appelman | G01S 1/00 | 342/357.59 |
| 2010/0023865 A1* | 1/2010 | Fulker | H04L 67/025 | 715/734 |
| 2010/0082174 A1* | 4/2010 | Weaver | G09B 5/02 | 700/295 |
| 2010/0274479 A1* | 10/2010 | Sheha | G01C 21/26 | 340/995.13 |
| 2010/0325588 A1* | 12/2010 | Reddy | H04L 63/0263 | 715/853 |
| 2012/0130513 A1* | 5/2012 | Hao | G05B 15/02 | 700/90 |
| 2012/0158161 A1* | 6/2012 | Cohn | G08B 29/02 | 700/90 |
| 2013/0014040 A1* | 1/2013 | Jagannathan | H04M 1/72586 | 715/765 |
| 2013/0073968 A1* | 3/2013 | Appelman | H04L 67/306 | 715/736 |
| 2013/0099011 A1* | 4/2013 | Matsuoka | G05D 23/1904 | 236/1 C |
| 2013/0274928 A1* | 10/2013 | Matsuoka | G05B 19/042 | 700/276 |
| 2014/0005839 A1* | 1/2014 | Stefanski | G05D 23/2454 | 700/276 |
| 2014/0058567 A1* | 2/2014 | Matsuoka | F24F 11/30 | 700/276 |
| 2014/0075321 A1* | 3/2014 | Masera | H04L 41/022 | 715/736 |
| 2014/0129032 A1* | 5/2014 | Harris | G05B 13/0265 | 700/275 |
| 2014/0278051 A1* | 9/2014 | McGavran | G06N 20/00 | 701/400 |
| 2015/0039105 A1* | 2/2015 | Lee | H04L 12/2827 | 700/90 |
| 2015/0245095 A1* | 8/2015 | Gonzalez | H04N 21/4751 | 725/28 |
| 2015/0261427 A1* | 9/2015 | Sasaki | H04L 12/2816 | 715/736 |
| 2016/0035052 A1* | 2/2016 | Tran | H02J 3/14 | 705/314 |
| 2016/0091871 A1* | 3/2016 | Marti | G06F 3/01 | 702/188 |
| 2016/0277203 A1* | 9/2016 | Jin | G05B 15/02 | |

* cited by examiner

SYSTEMS AND METHODS FOR RULES-BASED AUTOMATIONS AND NOTIFICATIONS

CROSS REFERENCE

This application claims priority from U.S. Provisional Patent Application No. 61/912,989 entitled "SYSTEMS AND METHODS FOR RULES BASED AUTOMATIONS AND NOTIFICATIONS," which was filed 6 Dec. 2013, and assigned to the assignee hereof.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor an aspect of a home or business. As home automation and security products expand to encompass other systems and functionality in the home, opportunities exist for enhancing the repeatability of automation behavior, as well as improving user interface presentation and navigation of programmable automation.

SUMMARY

Methods and systems are described for providing a graphical user interface suitable for viewing and modifying home automation, home security, and energy management devices. In some embodiments, different types of rules may be displayed in, and controlled from, a list view. The graphical user interface may display a list of items associated with automation rules where at least one item is associated with a generic automation rule and at least one item is associated with a context-associated automation rule. In some instances, at least one item is associated with a suggested automation rule. The suggested automation rule may include a learned automation rule. The list of items may also include a notification rule.

In another embodiment, a graphical user interface produced by an application program operating on a computing device having a display, a memory, and one or more processors to execute one or more programs stored in the memory is described. The graphical user interface includes a list of items, wherein the list includes a plurality of displayed items associated with rules, wherein at least one displayed item is associated with a generic automation rule, and at least one displayed item is associated with a context-associated automation rule.

In one example, the graphical user interface may include at least one displayed item associated with a suggested automation rule. The suggested automation rule may include a learned automation rule. The graphical user interface may include at least one displayed item associated with a notification rule. At least one context-associated automation rule may be associated with a property context. At least one context-associated automation rule may be associated with an external condition context. The property context may be a property location. At least one displayed item may include a natural language rule representation. One or more of the displayed items may be interactive. The computing device may be a portable electronic device with a touch screen display.

Another embodiment is directed to a computer-implemented method for displaying a rules on a display of a device. The method includes generating a list of rule items, wherein the list of rule items comprising at least one rule item associated with a generic automation rule and at least one rule item associated with a context-associated automation rule, and displaying the list of rule items.

In one example, the list of rule items further includes at least one rule item associated with a suggested automation rule. The suggested automation rule may include a learned automation rule. The list of rule items may further include at least one rule item associated with a notification rule. The method may further include determining one or more current contexts, retrieving a pre-defined list of context-associated rules from a memory, determining if the one or more current contexts correspond to one or more of the context-associated rules in the pre-defined list of context-associated rules, and generating a list of rule items wherein inclusion of a rule item in the list of rule items is based, at least in part, on the results of determining if the one or more current contexts correspond to one or more of the context-associated rules in the pre-defined list of context-associated rules. At least one context-associated rule may be associated with an external condition context. At least one context-associated rule may be associated with a property context. At least one of the current contexts may include a property location.

In another embodiment, a computer-implemented method for displaying rules on a display of a device is disclosed. The method includes generating a list of rule items, wherein the list of rule items comprising one or more automation rule items including at least two from the group comprising generic automation rule items, context-associated rule items, and suggested automation rule items. The method further includes displaying the list of rule items.

A further embodiment is directed to a computer program product for a rule-based automation and notification system. The product includes a non-transitory computer-readable medium that includes code for generating a list of rule items, the list of rule items comprising one or more automation rule items including at least two from the group comprising generic automation rule items, context-associated rule items, and suggested automation rule items, and code for displaying the list of rule items.

In one example, the list of rule items may further include at least one rule item associated with a suggested automation rule. The suggested automation rule may include a learned automation rule. The list of rule items may further include at least one suggested notification rule item. At least one context-associated rule item may be associated with a property context. At least one context-associated rule item may be associated with an external condition context.

In a yet further embodiment, a computer-implemented method for displaying a suggestion message associated with a suggested automation rule on a display of a device is described. The method includes generating a suggested automation rule, generating a suggestion message associated with the suggested automation rule, and displaying the suggestion message;

Another embodiment is directed to a rule-based automation and notification system that includes means for generating a list of rule items, the list of rule items comprising one or more automation rule items including at least two from the group comprising generic automation rule items, context-associated rule items, and suggested automation rule items, and means for displaying the list of rule items.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
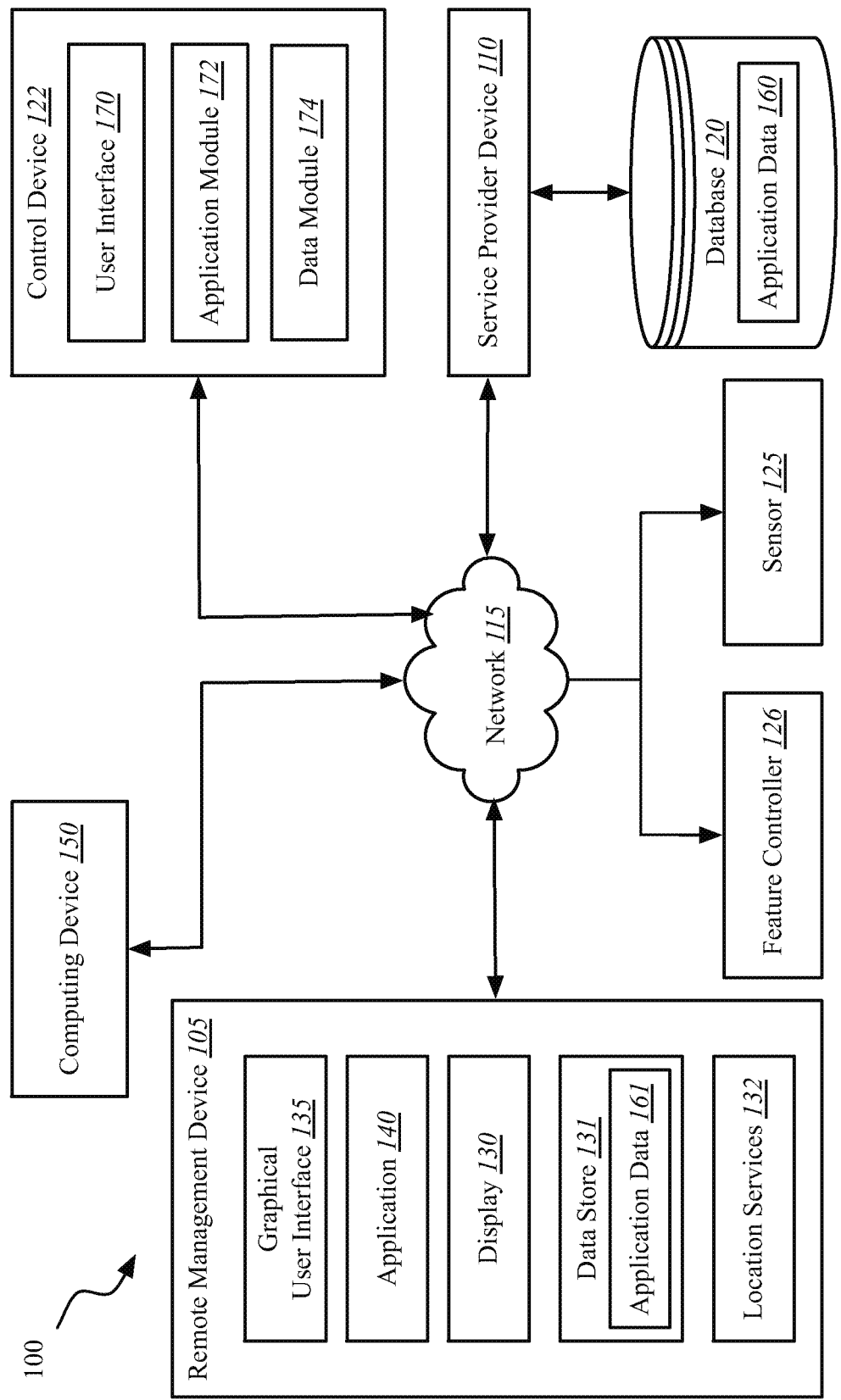
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security. More specifically, the systems and methods described herein relate to an improved graphical user interface for integrated monitoring and managing of home automation systems and home security systems.

Referring now to FIG. 1, a block diagram illustrates one embodiment of an environment 100 in which the present systems and methods may be implemented. In some embodiments, the systems and methods described herein are performed on one or more devices (e.g., remote management device 105 or control device 122). The environment 100 may include a remote management device 105, a service provider device 110, a sensor 125, a feature controller 126, a display 130, a computing device 150, a control device 122, and/or a network 115 that allows the remote management device 105, service provider device 110, computing device 150, control device 122, sensor 125, and feature controller 126 to communicate with one another. Examples of remote management device 105 include control panels, indicator panels, multi-site dashboards, mobile devices, smart phones, personal computing devices, computers, servers, etc. Examples of the control device 122 include a dedicated home automation computing device (e.g., wall-mounted controller), a personal computing device (e.g., laptop, desktop, etc.), a mobile computing device (e.g., tablet computing device, smartphone, etc.), and the like.

In some embodiments, the remote management device 105 is a portable electronic device with a touch screen display. The width of the portable electronic device may range from about 60 mm to 195 mm, the height may range from about 110 mm to 275 mm, and/or the weight may range from about 100 g to 2000 g.

In some embodiments, remote management device 105 may be integrated with control device 122 in the form of one or more personal computing devices (e.g. mobile devices, smart phones, and/or personal computing devices) to both control aspects of a property as well as to receive and display notifications regarding monitored activity of a property. Examples of sensor 125 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 125 may represent one or more separate sensors or a combination of two or more sensors in a single sensor device. For example, sensor 125 may represent one or more camera sensors and one or more motion sensors connected to environment 100. Additionally, or alternatively, sensor 125 may represent a combination sensor such as both a camera sensor and a motion sensor integrated in the same sensor device. Although sensor 125 is depicted as connecting to remote management device 105 over network 115, in some embodiments, sensor 125 may connect directly to remote management device 105. Additionally, or alternatively, sensor 125 may be integrated with a home appliance or fixture such as a light bulb fixture. Sensor 125 may include an accelerometer to enable sensor 125 to detect a movement. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to enable sensor to detect proximity of a person relative to a predetermined distance from a dwelling (e.g., geo-fencing). Sensor 125 may include one or more security detection sensors such as, for example, a glass break sensor, a motion detection sensor, or both. Additionally, or alternatively, sensor 125 may include a smoke detection sensor, a carbon monoxide sensor, or both.

Feature controller 126 may represent one or more separate feature controls or a combination of two or more feature controls in a single feature controller device. For example, feature controller 126 may represent one or more camera controls and one or more door lock controls connected to environment 100. Additionally, or alternatively, feature controller 126 may represent a combination feature controller such as both a camera control and a door lock control integrated in the same feature controller device. Although feature controller 126 is depicted as connecting to remote management device 105 over network 115, in some embodiments, feature controller 126 may connect directly to remote management device 105. Additionally, or alternatively, feature controller 126 may be integrated with a home appliance or fixture such as a light bulb fixture. Feature controller 126 may include a lighting control mechanism configured to control a lighting fixture. Feature controller 126 may include a wireless communication device enabling feature controller 126 to send and receive data and/or information to and from one or more devices in environment 100. Additionally, or alternatively, feature controller 126 may include an appliance control interface enabling feature controller 126 to send commands to an integrated appliance interface. Feature controller 126 may include an interface to a security system to monitor, activate, modify and/or arm one or more security features.

In some configurations, remote management device 105 includes components such as a graphical user interface 135, application 140, display 130, data store 131, and location services 132. Although the components of remote management device 105 are depicted as being internal to remote management device 105, it is understood that one or more of the components may be external to the remote management device 105 and connect to remote management device 105 through wired and/or wireless connections. For example, one or more components (e.g., software, firmware, and/or hardware) of application 140 may be located, installed, and/or part of control device 122, computing device 150, service provider device 110, sensor 125, feature controller 126, and/or database 120.

In some embodiments, computing device 150 may include a television set. Additionally, or alternatively, computing device 150 may include one or more processors, one or more memory devices, and/or a storage device. Examples of computing device 150 may include a viewing device associated with a media content set top box, satellite set top box, cable set top box, DVRs, personal video recorders (PVRs), and/or mobile computing devices, smart phones, personal computing devices, computers, servers, etc. Thus, application 140 may be installed on computing device 150 in order to allow a user to interface with a function of remote management device 105, control device 122, and/or service provider device 110.

In certain implementations, control device 122 includes components such as user interface 170, application module 172, and data module 174. Although the components of control device 122 are depicted as being internal to control device 122, it is understood that one or more of the components may be external to the control device 122 and connect to remote management device 105 through wired and/or wireless connections. For example, with reference now to FIG. 2, one or more components (e.g., software, firmware, and/or hardware) of control device application module 172 may be located in, installed at, and/or part of remote management device 105, web service application module 210 (e.g., see FIG. 2), computing device 150, service provider device 110, and/or database 120. Data content and data management functions of control unit data module 174 may be located, replicated, or both in one or more of database 120, web service data module 225, and remote management device data store 131.

In some embodiments, remote management device 105 communicates with service provider device 110 via network 115. Examples of networks 115 include cloud networks, local area networks (LAN), wide area networks (WAN), virtual private networks (VPN), wireless networks (using 802.11, for example), and/or cellular networks (using 3G and/or LTE, for example), etc. In some configurations, the network 115 may include the Internet. In some embodiments, a user may access the functions of remote management device 105, control device 122, or both from computing device 150. For example, in some embodiments, computing device 150 includes a mobile application that interfaces with one or more functions of remote management device 105, control device 122, and/or service provider device 110.

In some embodiments, service provider device 110 may be coupled to database 120. Database 120 may include a program content 160 associated with the monitored activities of a property. For example, remote management device 105 may access application data 160 in database 120 over network 115 via service provider device 110. Database 120 may be internal or external to the service provider device 110. In one example, remote management device 105 may include an integrated data store 131, being internal or external to device 105. Data store 131 may include application data 161 associated with the monitoring activities of a property. In some embodiments, application data 161 includes one or more replicated application data 160 items. In certain instances, one or more application data 161 items are synchronized with one or more application data 160 items.

Figure 2:
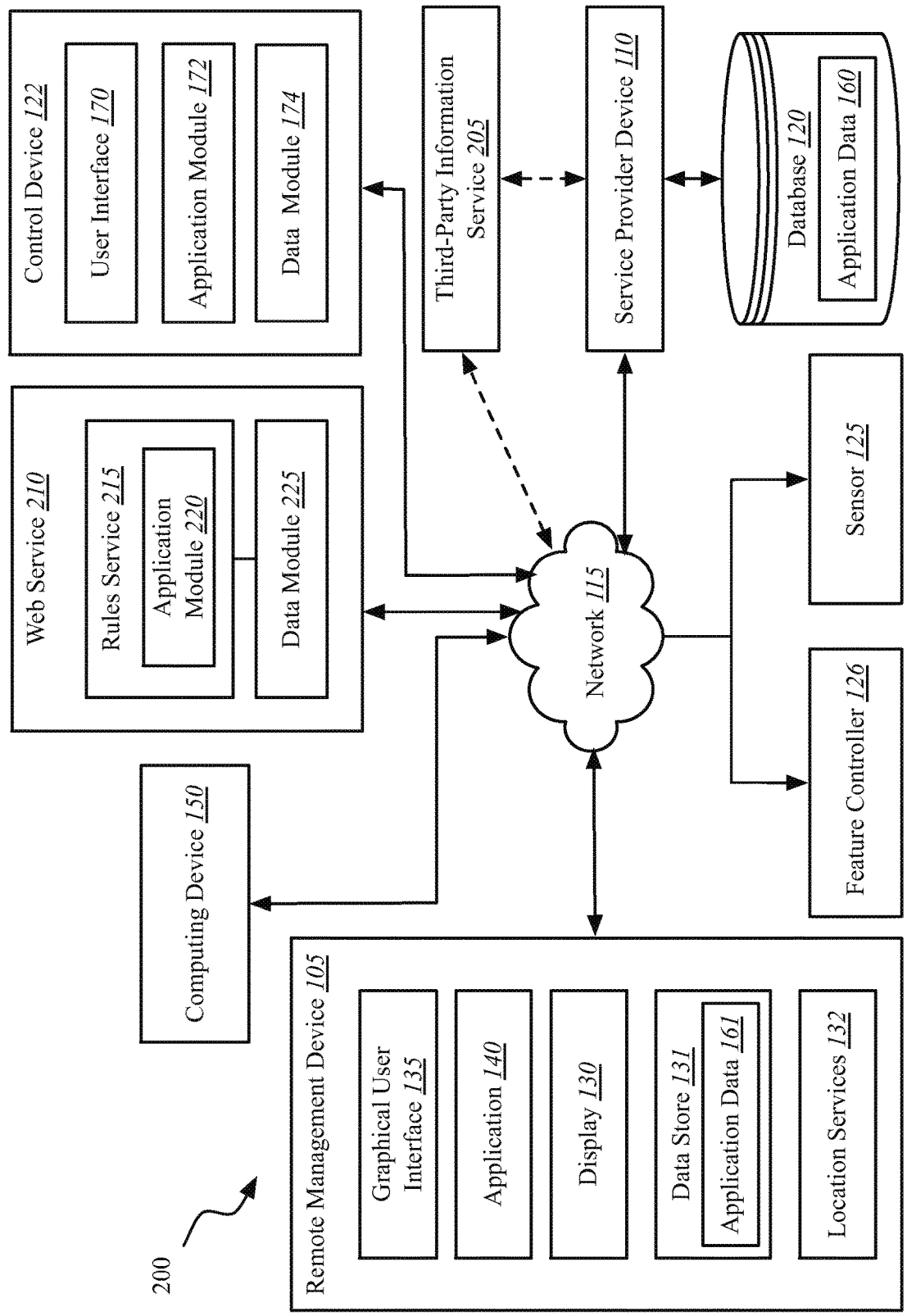
FIG. 2 is a block diagram of an environment in which the present systems and methods may be implemented.

Referring now to FIG. 1 and FIG. 2, in some embodiments, service provider device 110 is coupled to one or more third-party information services 205. Third party information service 205 may provide information associated with conditions external to the automation and security system. For example, external messages associated with external context conditions such as, for example, severe weather, criminal activity, and the like may be provided by the third-party information services 205. In some instances, the third-party information services 205 may be communicatively coupled to service provider device 110 over network 115, which then may provide the external message to selected control units 122, remote management devices 105, and computing devices 150. Alternatively, and in addition to, third-party information services 205 may be communicatively coupled to the control unit 122 over network 115. External messages may be pushed to control unit 122 by third-party information service 205, pulled by control unit 122 from third-party information service 205, or both.

In certain instances, web service 210 includes a rules service 215 and a data module 225. Web service 210 may provide classes and/or associated methods and data structures for one or more of creating, retrieving, configuring, storing, and suggesting automation and notification rules for use by control unit 122, remote management device 105, service provider device 110, or any combination thereof. In some implementations, the web service 210 exposes functions via standard protocols such as, for example, REST, SOAP, JSON, and the like. One or more of the services provided by web service 210 may include services redundant to those functions provided by control unit application module 172. In some instances, a synchronization service (not shown) may synchronize rules data across one or more database or data modules 120, 131, 174, 225.

Still referring to FIG. 1 and FIG. 2, application 140 may allow a control (either directly or via home automation controller 155) of an aspect of the monitored property, including security, energy management, locking or unlocking a door, checking the status of a door, locating a person or item, controlling lighting, thermostat, cameras, receiving notification regarding a current status or anomaly associated with a home, office, place of business, and the like. In some configurations, application 140 may be configured to interface with control device 122 and provide a graphical user interface 135 to display home automation content on remote management device 105 and/or computing device 150. Thus, application 140, via the graphical user interface 135, may allow users to control aspects of their home, office, or other property.

Figure 3:
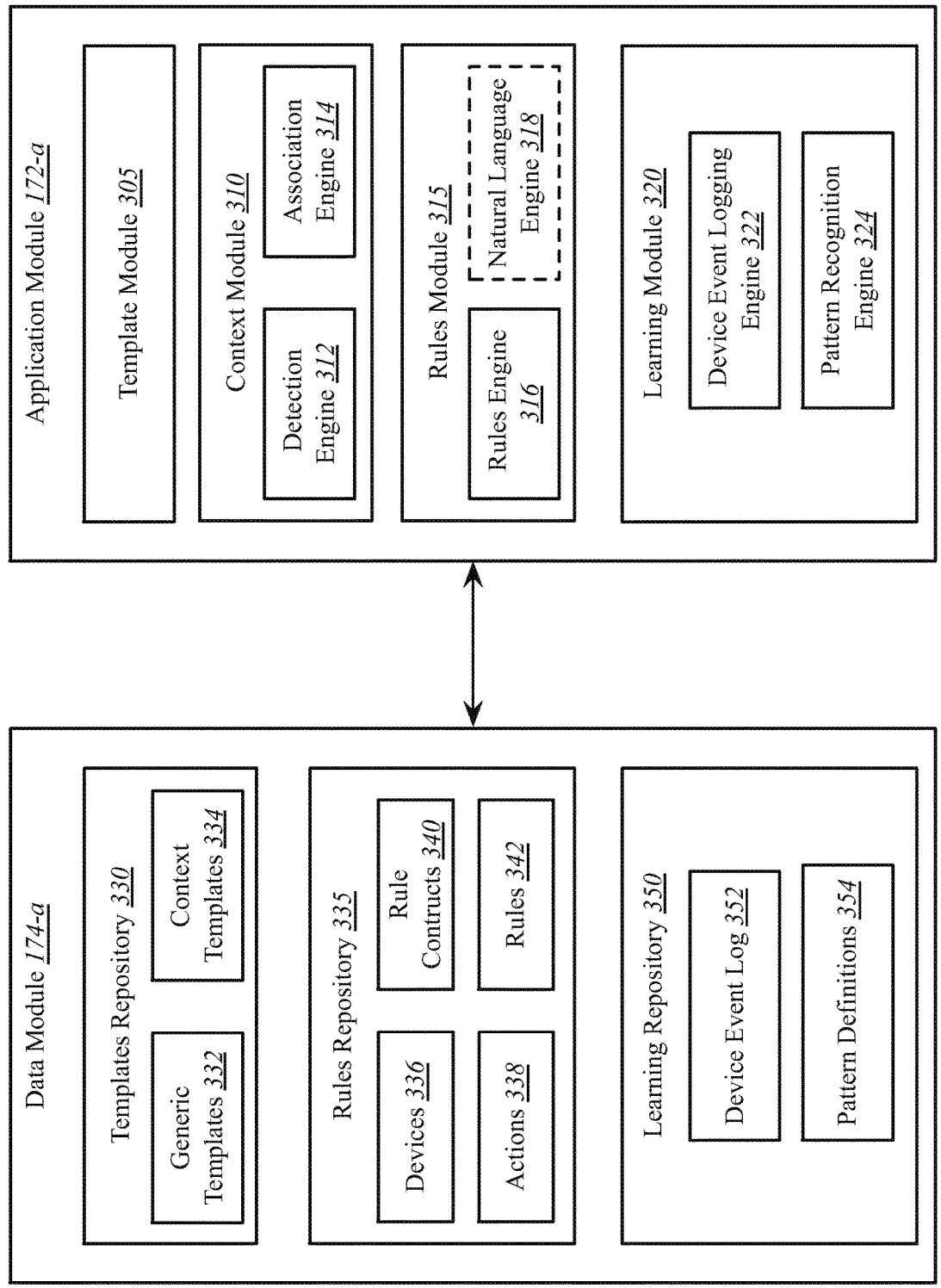
FIG. 3 is a block diagram of one example of an application and data module architecture of the control device of FIG. 1 and FIG. 2.

Referring now to FIG. 3, in some embodiments, an example application module 172-a of the application module 172 of FIG. 1 and FIG. 2 includes a template module 305, a context module 310, a rules module 315, and a learning module 320. Template module 305 provides classes and/or associated methods and data structures for storing, retrieving, and structuring one or more rules templates. Templates can be, for example, generic templates applicable to all system installations that include relevant devices, and context-associated templates applicable to installations based on context such as, for example, a property context or an external condition context. These classes and/or methods are supported by data and data relations stored in a templates repository 330 that can include a generic templates data store 332 and a context templates data store 334.

Templates provide a framework for the construction of rules, where the templates may vary in the number and type of rule contracts, preset parameters, or both. Parameters can include, for example, rule contracts, devices or sets of devices, systems, device actions, system actions, action conditions or triggers, rule action duration, rule envelope configurations, and associated notification configurations. A generic rule template for an outlet rule can include, for example, a list of available feature controllers associated with an outlet, available actions associated with the feature controllers, a set of possible conditions for triggering one or more of the feature controllers, a duration for the action to persist, an envelope of time in which the rule would be active, and associated notification options. Any of these parameters may be set prior to presentation and may be either interactive or non-interactive. Templates may be stored as XML configurations, database entries, code modules, or the like.

In some implementations, a context module 310 includes a detection engine 312 and an association engine 314. Association engine 314 provides classes and/or associated methods and data structures for associating one or more contexts with one or more rule templates. Associations can be stored in the context templates data store 334, or in an separate relational data store. Detection engine 312 provides classes and/or associated methods and data structures for detecting context conditions, and for providing detected context conditions and related context data to the rules module 315. Context module 310 can obtain context conditions from one or more of service provider device 110, third party information service 205, web service 210, sensor 125, feature controller 126, location services 132, or user input through user interface 135 or user interface 170.

In some embodiments, rules module 315 includes rules engine 316 and an option natural language engine 318. Rules engine 316 provides classes and/or associated methods and data structures for creating, modifying, storing, retrieving, categorizing, enabling, disabling, and triggering rules. These classes and/or methods are supported by data and data relations stored in a rules repository 335 that can include a devices data store 336, an actions data store 338, a rule constructs data store 340, and a rules data store 342. The devices data store can store a list of devices. In some implementations, the devices data store can additionally include one or more non-device values corresponding to one or more systems, such as, for example, a security system, and their association with one or more rules. The actions data store 338 can store a list of actions and their association with one or more devices or systems in the device data store. The actions data store can include for example, device actions, system actions, notification actions, and duration actions. The rule contracts data store 340 can store the logical constructs connecting rule parameters such as devices or sets of devices, systems, device actions, system actions, action conditions or triggers, rule action duration, rule envelope, and associated notification configurations. Rules data store 342 can store rules that include a combination of one or more devices or systems, one or more actions, and one or more rule contracts. In addition, the rules data store 342 may also include relational information maintaining an association between a rule with one or more contexts. In some instances, rule envelope information is also stored in the rules data store 342.

In some instances, learning module 320 includes device event logging engine 322 and pattern recognition engine 324. Learning module 320 provides classes and/or associated methods and data structures for tracking, storing, and retrieving device events, tracking, storing, and retrieving associated context conditions, retrieving pattern definitions, comparing device events and associated contexts to pattern definitions, and directing the rules engine to create suggestion rules. These classes and/or methods are supported by data and data relations stored in a learning repository 350 that can include a device event log data store 352, and a pattern defections data store 354. The device event log data store 352 can store device events and system events, and their association with one or more contexts, including a time context. The pattern definitions data store 354 can store patterns to be used by the pattern recognition engine 324 in identifying event patterns suggestive of an automation rule. For example, a pattern definition X might include events that occur within 15 minutes before or after time t at least 4 times within seven consecutive days. The device event logging engine 322 may have detected and logged the powering on of the living room television every day for 5 consecutive days within 10 minutes of 6:00 pm. The pattern recognition engine 324 may analyze the event pattern and compare the pattern with one or more pattern definitions. Upon identifying a match with X, the learning module 320 may communicate with the rules module 315 to create a suggested rule based on the parameters obtained from the pattern comparison performed by the pattern recognition engine 324. The suggestion rule may be stored in the rules data store 342 along with an indication that the rule is a suggested rule.

Figure 4:
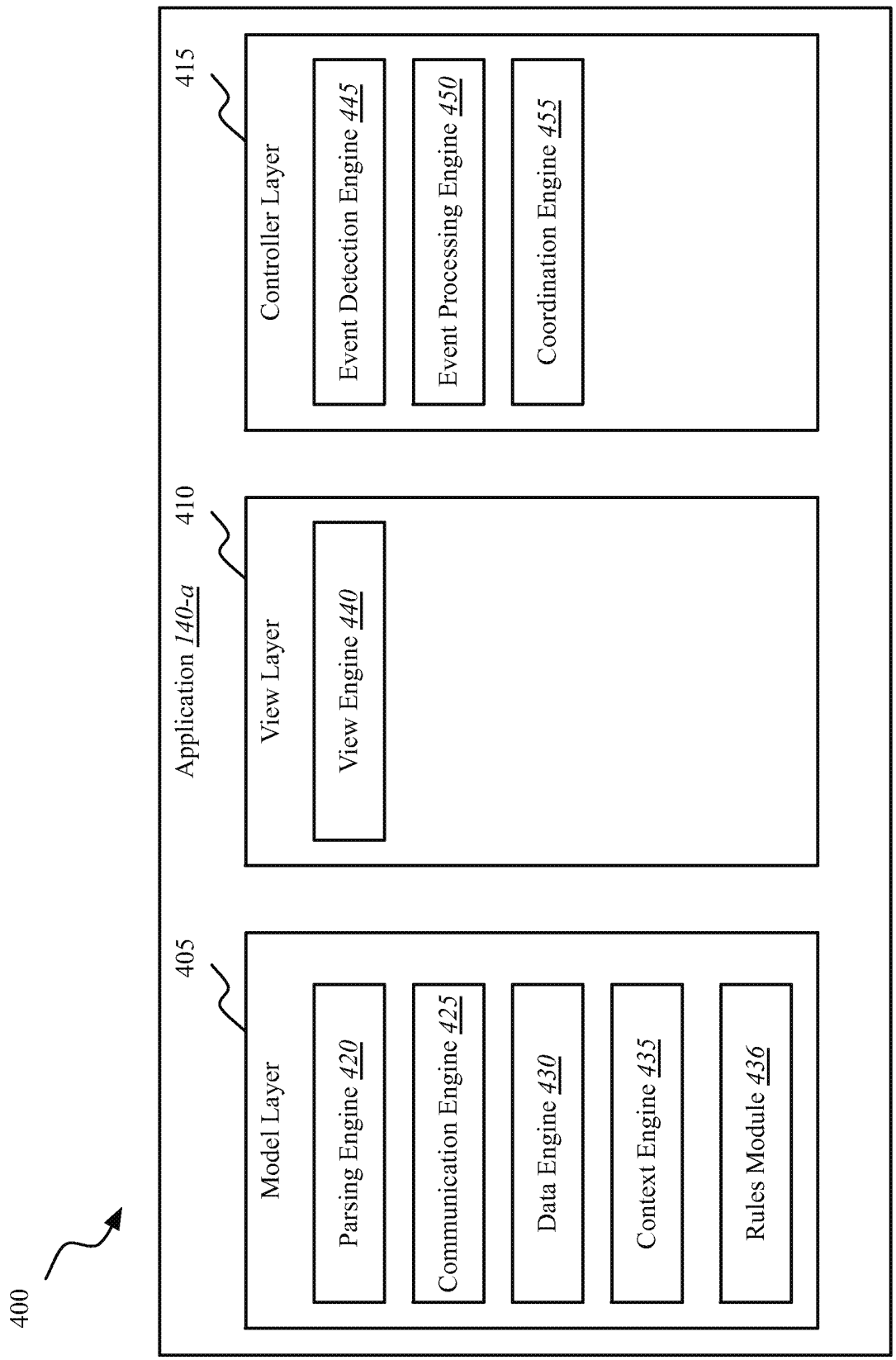
FIG. 4 is a block diagram of one example of an app layer architecture of the remote management device application of FIG. 1 and FIG. 2

Referring now to FIG. 4, in some embodiments, remote management device application 140 may be implemented according to application layer architecture of application 140-a. Application 140-a may be one example of remote management device application 140 depicted in FIG. 1 and FIG. 2. Application 140-a may include a model layer 405, a view layer 410, and a controller layer 415. The model layer 405 may include a parsing engine 420, a communication engine 425, a data engine 430, a context engine 435, and a rules module 236. The view layer 410 may include a view engine 440. The controller layer 415 may include an event detection engine 445, an event processing engine 450, and a coordination engine 455. These engines may be implemented as objects, modules, routines, services, distributed services, web services, or any other programming model capable of implementing the systems and methods described herein.

The communication engine 425 may be configured to communicate with other computing devices, including sending commands, sending data, and receiving data. Computing devices may include, for example, controller unit 122, computing device 150, service provider device 110, sensor 125, or feature controller 126. In certain instances, the communication engine may be configured to send, receive, or both, message from web service 210. In one example, communication engine 425 may send a request to a control unit 122 requesting control unit 122 to send rule data. Alternatively, and in addition, the communication engine 425 may implement a listener service to receive broadcast data, streamed data, or both. The communication engine 425 may pass data directly to other engines, modules, and services. In addition, or alternatively, the communication engine 425 may create data structures, such as, for example, by instantiating objects, queuing data structures for retrieval by other engines, notifying other engines of data structures of interest, passing data structures directly to other engines, and the like. For example, the communication engine 425 may detect and receive a message from control unit 122 indicating that a suggested rule was identified by learning module 320 (e.g., see FIG. 3) and is available for presentation. The communication engine 425 may instantiate a suggested rule object that includes the received rule data, and place the suggested rule object in a queue for retrieval by the parsing engine 220.

Parsing engine 420 may be configured to process rule data, context data, template data, and the like received from rules module 436, data engine 430 service provider device 110, control device 122, or web service 210. In some embodiments, this data is received via communication engine 425, data engine 430, or both. For example, parsing engine 420 may request one or more rule configurations from control device 122. In some implementations, a rule object may contain multiple rule objects of one or more types. For example, a rule object could contain one or more of a generic rule object, a context-associated rule object, a suggested rule object, and a notification rule object. Data engine 430 may retrieve rule-related data from data store 131 and provide rule-related data to parsing engine 420. Parsing engine 420 may further retrieve device settings data from communication engine 425, and pass the settings data to the rules module 436. If the parsing engine 420 detects the presence of multiple types of rules, the parsing engine 420 may instantiate a list object for use in further processing and or presentation, such as, for example, construction of an automation rule list object arranged by type. As a further example, the parsing engine may provide n automation rule list object to the coordination engine 455 for delivery to the view engine 440 for population of a presentation view, such as an automation rules listing view (e.g., see FIG. 8).

In some embodiments, a context engine 435 may determine user context, system context, property context, external condition context, or the like. User contexts may include, for example, a user location such as at home and away from home. Property contexts may include, for example, property location, property attributes, deployed devices, and the like. External condition contexts can include, for example, criminal event conditions, emergency conditions, regional warning conditions, and the like. Contexts may be used to control display and availability of certain rules, execution of certain rules, or both. In some implementations, a context configuration may be created identifying one or more rules to be displayed in an automation rules listing view (e.g., see FIG. 8) when that context is detected by the context engine 435. The context configuration may be stored in a persistent data store integrated with the remote management device 105, or a remote data store such as database 120 (e.g., see FIG. 1 and FIG. 2). For example, when a third party weather information service providing alerts relating to external context conditions is detected, a rule may be displayed allowing identification of appliances or outlets to be turned of when an external severe thunderstorm warning message is received. In another example, a location context such as a high fire zone context may be associated with a property's location such that a rule for running outside sprinklers is available when temperature and humidity conditions are in excess of a certain threshold.

In certain instances, event detection engine 445 and event processing engine 450 recognize user interface events and initiate methods associated with those events. For example, when a done button is selected after editing a rule configuration, the event detection engine 445 detects the associated selection event and calls the event processing engine 450 to initiate the appropriate processing activities, such as directing the coordination engine 455 to pass information to the data engine 430 for persistent storage, and/or directing the view engine 440 to generate the appropriate presentation view according to the navigation path.

Figure 5:
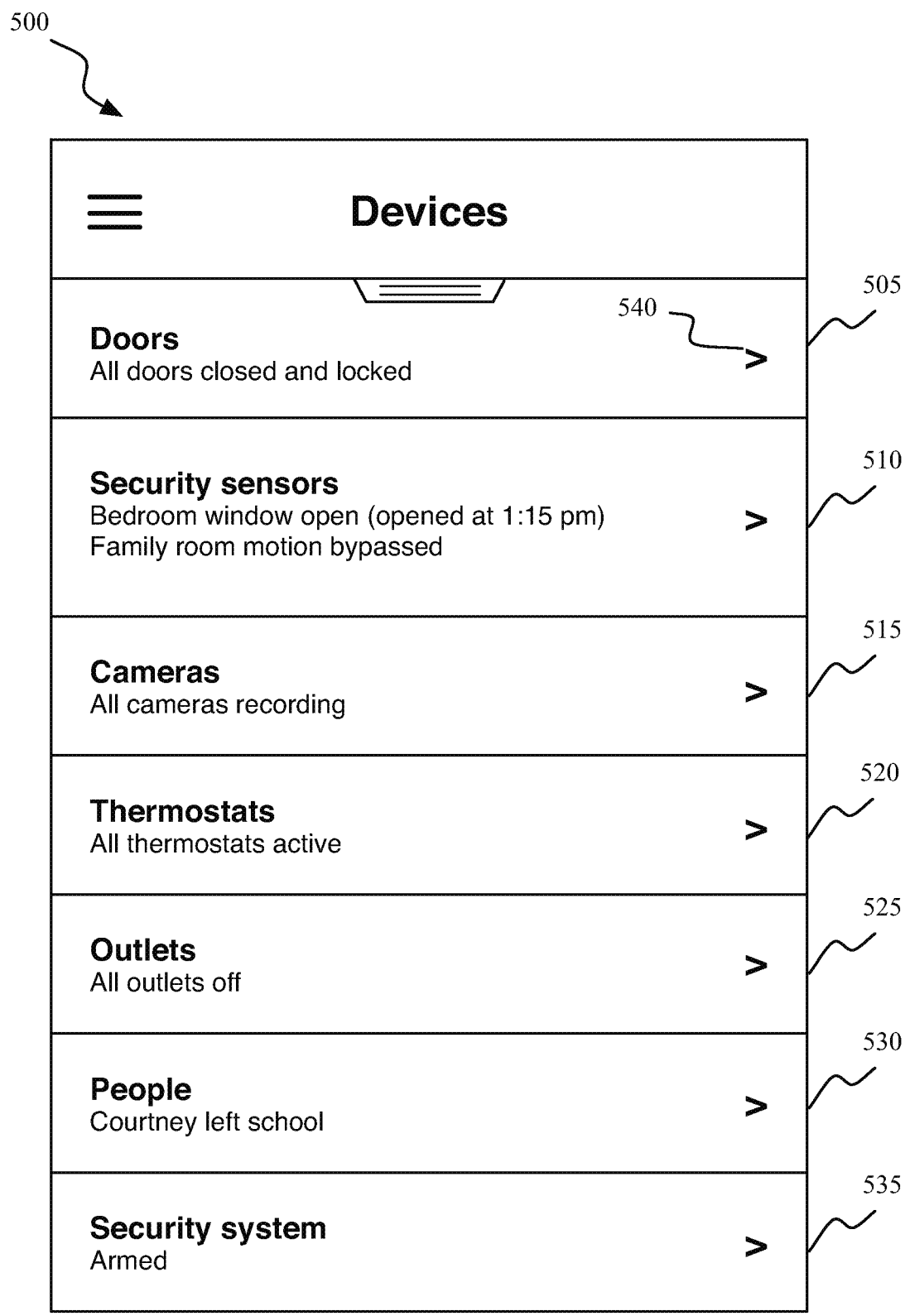
FIG. 5 is a block diagram of an exemplary user interface for a device type summary listing view displayed on a remote management device of FIG. 1 and FIG. 2.

Referring now to FIG. 5, an exemplary user interface for displaying a device type summary listing view 500 may be generated by the view engine 440 (e.g., see FIG. 4). Each device type list item 505, 510, 515, 520, 525, 530, 535 may be displayed as a static element or an active control, with active controls indicated, for example, by a graphical indicator such as an arrow 540. Detection of a selection event associated with an active control by the event detection engine 445 may result in the event processing engine 450 generating a view with information or functionality relating to the device type list item. Such information or functionality may include, for example, device configuration functions, detailed device information, access to associated automation and notifications rules, and the like. For example, when the event detection engine 445 detects the selection of the outlets device type list item control 525, the event processing engine 450 may initiate view presentation by the view engine 440 of an interactive view providing access to one or more outlet feature controls for one or more outlets.

Figure 6:
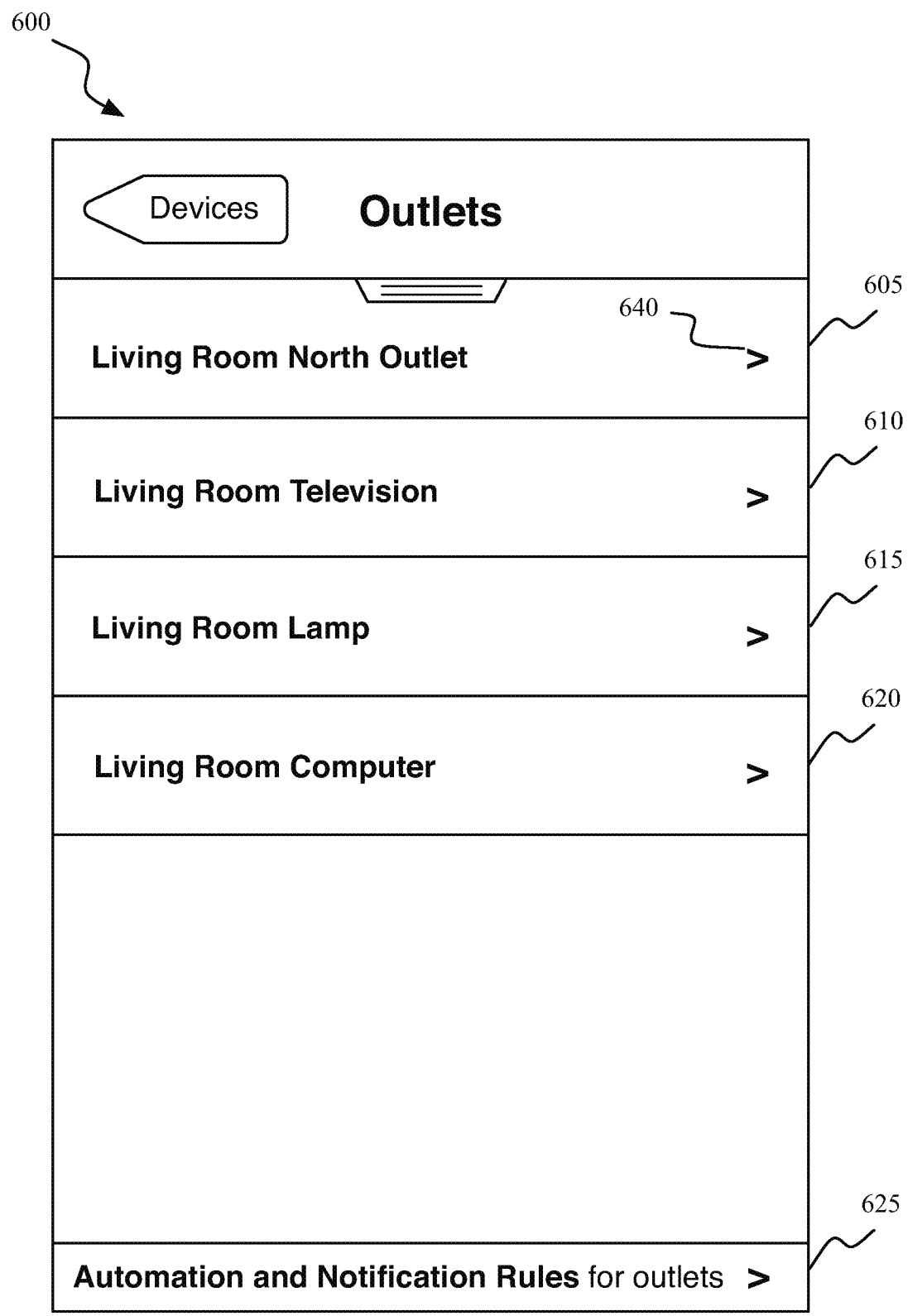
FIG. 6 is a block diagram of an exemplary user interface for a device type listing view displayed on a remote management device of FIG. 1 and FIG. 2.

Referring now to FIG. 6, an exemplary user interface for displaying a list of outlets 600 may be generated by the view engine 440 (e.g., see FIG. 4). Device list item controls 605, 610, 615, 620 may include a text identifier identifying, for example, the outlet location 605 or the associated appliance or device powered by the outlet 610, 615, 620. Each device list item 605, 610, 615, 620 may be displayed as a static element or an active control, with active controls indicated, for example, by a graphical indicator such as an arrow 640. In some instances, detection of a selection event associated with an automation and notification rules control for the device type 625 triggers the view engine to generate a view of all rules associated with the device type (e.g., see FIG. 8). Detection of the selection event associated with a device list item may trigger generation of the device view for the associated device 700 (e.g., see FIG. 7). Detection of a selection event associated with a devices button directs triggers generation of the device type summary listing view 500 (e.g., see FIG. 5).

Figure 7:
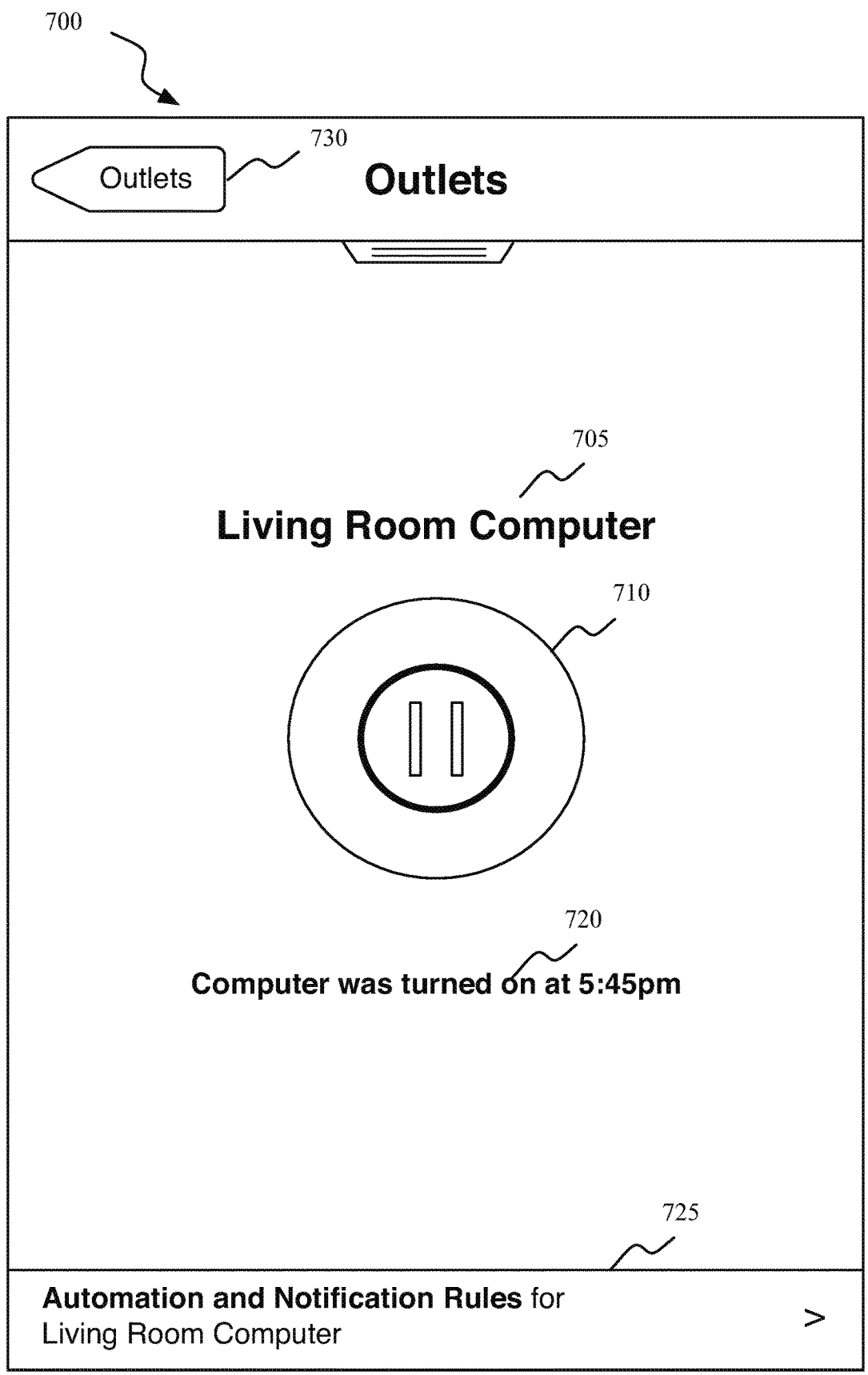
FIG. 7 is a block diagram of an exemplary user interface for a device view displayed on a remote management device of FIG. 1 and FIG. 2.

Referring now to FIG. 7, an exemplary user interface for displaying a view of a device 700 may be generated by the view engine 440 (e.g., see FIG. 4). The view may include a device designator 705, a graphic symbol or icon 710, and device state data such as, for example, the type and time of the last event detected 720 by one or more sensors 125, feature controllers 126, and/or systems (e.g., see FIG. 1 and FIG. 2). Detection of a selection event associated with an automation and notification rules control for the device 725 triggers the view engine to generate a view of all rules associated with the device 600 (e.g., see FIG. 6). Detection of a selection event associated with an outlets button 730 triggers generation of the device type listing view for the outlet device type 600 (e.g., see FIG. 6).

Figure 8:
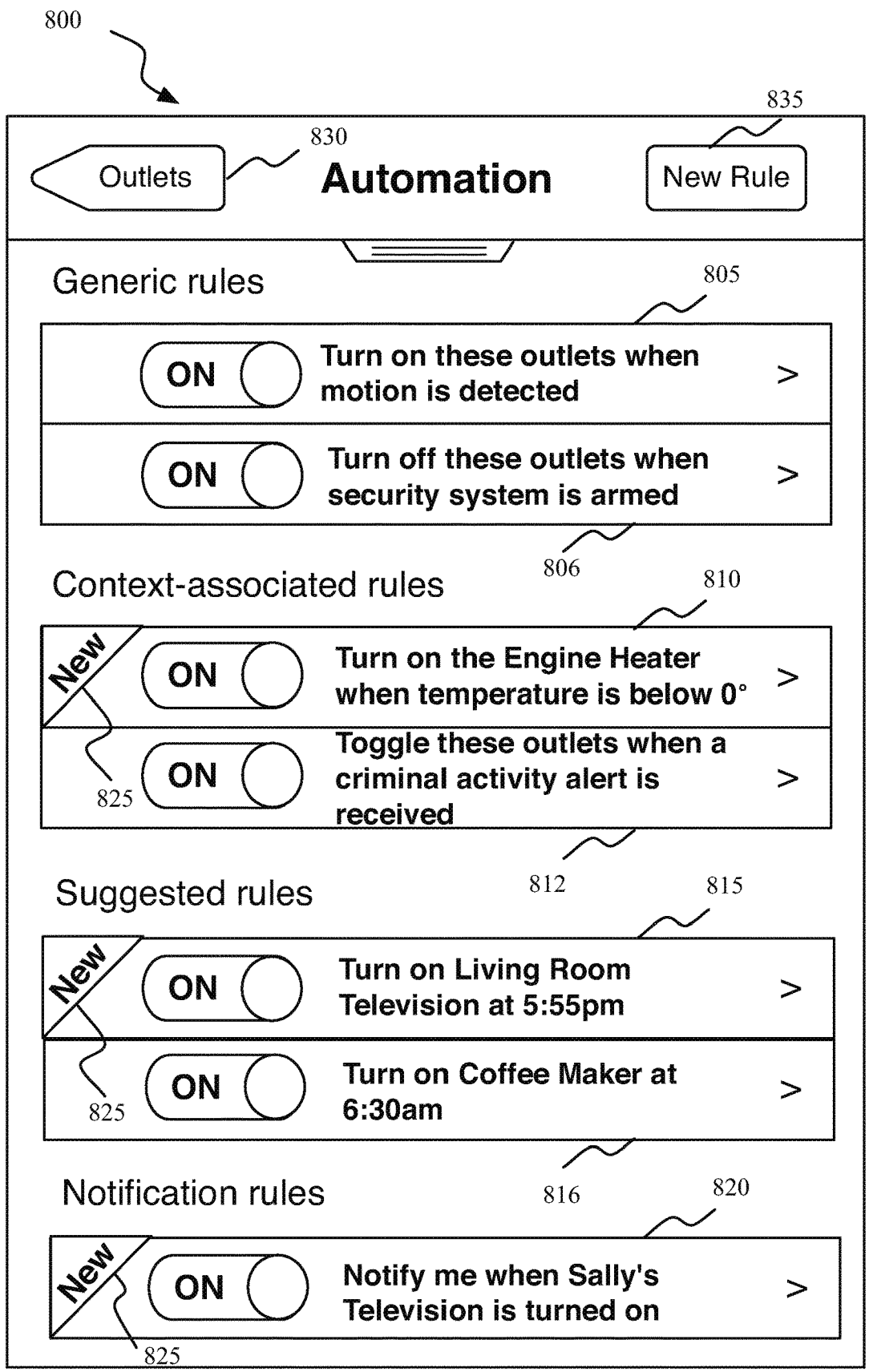
FIG. 8 is a block diagram of an exemplary user interface for an automation rules listing view displayed on a remote management device of FIG. 1 and FIG. 2.

Referring now to FIG. 8, in some embodiments, an automated rule listing view 800 includes one or more rules of one or more types. Types of rules can include generic rules 805, 806, context-associated rules 810, 812 suggested rules 815, 816 and notification rules 820. Generic rule type rules are rules that are compatible with any automation system deployment that includes the sensors, feature controllers or integrated systems associated with the rule. For example, an automation system that is integrated with a security system and includes one or more outlet feature controller may provide a generic rule that relates the two attributes. Examples include a rule that allows for one or more outlets to be turned on when motion is detected 805, and a rule where one or more outlets are turned off when a security system is armed 806. Rules may be based on various associations such as sensor/device associations 805, system/device associations 806, and the like.

Context-associated rule type rules are rules that are compatible with automation system deployments associated with one or more defined context conditions. Context conditions can include, for example, property contexts, such as a property location, or external condition contexts, such as criminal activity or weather activity. One example may include a rule that is associated with a property context, such as a location where extreme low temperatures are common. Such a rule may, if activated, turn on a garage outlet associated with an automobile engine heater device, something that is typical in frigid locations. This may be a defined rule where rule availability is conditioned on the property location being in a designated as frigid region. Another example may include a rule associated with an external condition context, such as a criminal activity alert. Such a rule may toggle selected outlets when a criminal activity alert is received by the automation system 812. In certain instances, rule availability may be conditioned on whether the system is communicatively coupled to a third party information service 205 (e.g., see FIG. 2) configured to deliver criminal activity alerts. Rules may be based on various associations such as location/sensor/device associations 810, alert/device associations 812, and the like.

Suggested rule type rules are rules that may be constructed by the learning module 320 (e.g., See FIG. 3) based, at least in part, on an assessment of a series of events associated with a device. Once constructed, the rules module 315 can store the suggested rule in a rules repository 335 with a suggestion designator, such as a database flag value, for possible presentation, automated acceptance, or both. In some instances, system settings control whether suggested rules are created, presented, automatically accepted, and the like. One example may include a rule based on an analysis comparing a series of device events to a pre-defined pattern. Such a rule may direct the feature controller associated with living room television outlet to power the television at the same time each day 815, or direct the feature controller associated with the coffee maker to power on the coffee maker at the same time each day 816.

Notification rule type rules are rules that do not have an associated device action. Instead, notification rule type rules have a notification event as the associated rule action. One example may include a rule triggering a notification event upon detection of an outlet power event. Such a rule may direct the generation and transmission of one or more notifications when a television in a room, such as a child's bedroom, is turned on 820.

In some instances, custom rules can be created. Detection of the selection event associated with a new rule button 835 may trigger the view engine to display a rule configuration view. New rules may be identified by indicia such as, for example, corner notations 825. New rules may include, for example, custom rules, recently suggested rules, or both.

Figure 9:
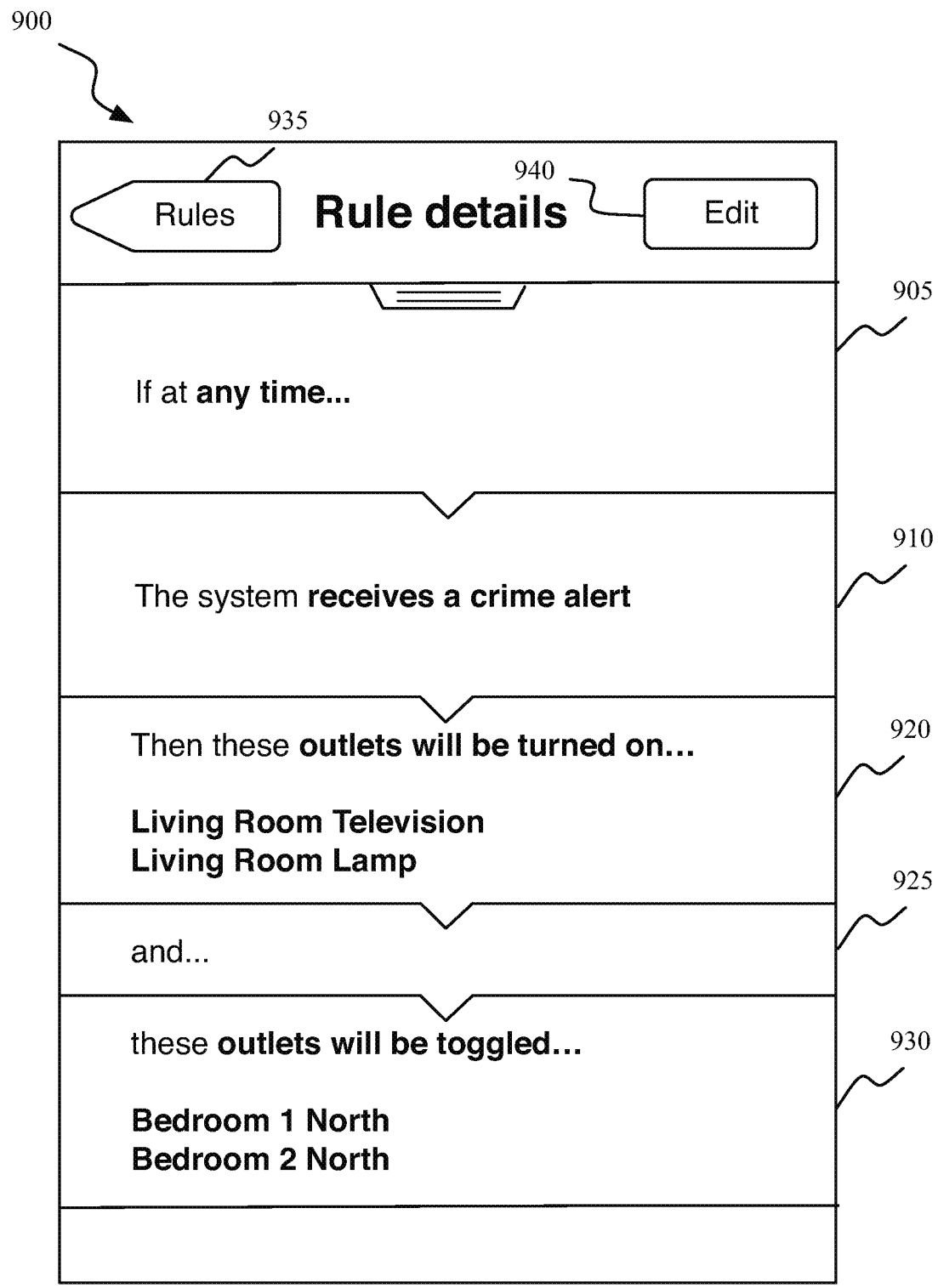
FIG. 9 is a block diagram of an exemplary user interface for a rule details view for a rule item of FIG. 8 displayed on a remote management device of FIG. 1 and FIG. 2.

Referring now to FIG. 9, an exemplary user interface for displaying a rule detail view for an automated rule list item may be generated by the view engine 440 (e.g., see FIG. 4). In some embodiments, optional natural language engine 318 (e.g., see FIG. 3) generates natural language rule representations of the rule contracts stored in the rule contracts repository 340, rule constructs contained in templates stored in the templates repository 330, or both. A natural language rule detail view can contain a series of translated constructs such as a rule envelope construct 905, a system or device construct combined with an action condition or trigger construct 910, a device action or system action construct 920, 930, and logical connectors 925. Constructs may also include rule action duration constructs and notification configuration constructs. Detection of the selection event associated with a rules button 935 triggers display of the automated rule listing view 800 (e.g., see FIG. 8). Detection of the selection event associated with an edit button 940 triggers display of rule configuration view 1000 (e.g., see FIG. 10).

Figure 10:
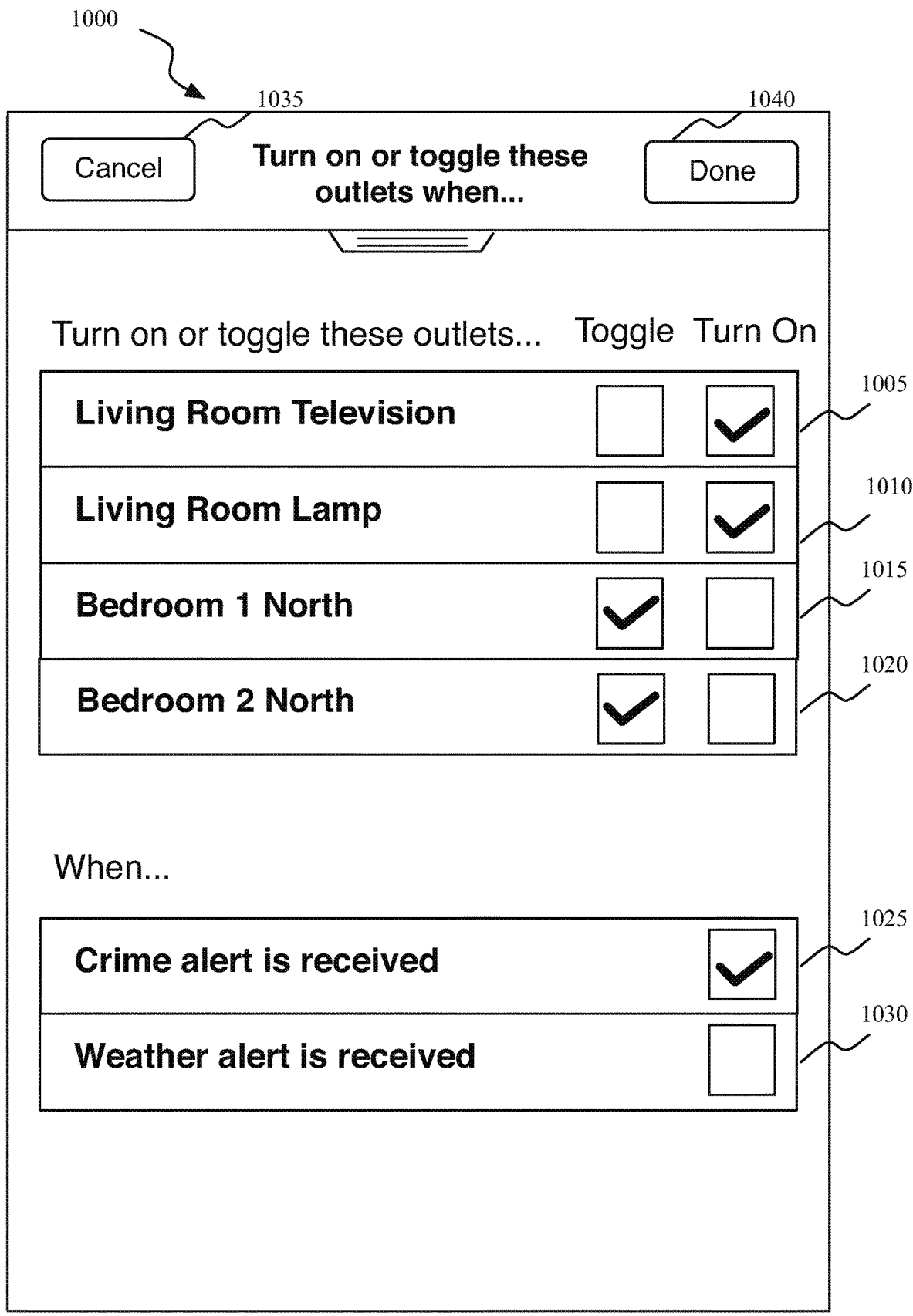
FIG. 10 is a block diagram of an exemplary user interface for rule configuration view for a rule item of FIG. 8 displayed on a remote management device of FIG. 1 and FIG. 2.

Referring now to FIG. 10, an exemplary user interface for displaying editable rule parameters is shown. In certain implementations, the rules engine 316 may communicate with one or more of the natural language engine 318, the context module 310, and the template module 305 (e.g., see FIG. 3) Rule contracts and parameter values obtained may be passed to the coordination engine 455 (e.g., see FIG. 4) for use in directing the view engine 440 to generate the appropriate rule configuration view. For example, an editable rule configuration view 1000 could include an outlet activation rule. Such a rule may turn on or toggle designated outlets 1005, 1010, 1015, 1020 when one or more associated external condition contexts are detected 1025, 1030. When a crime alert is received 1025, feature controllers controlling outlets associated with a living room television and a living room lamp may be directed to power on the controlled outlets 1005, 1010. In addition, feature controllers controlling outlets in one or more rooms may be directed to toggle the power state for the controlled outlets 1015, 1020. Detection by the event detection engine 445 of the selection event associated with the done button 1040 may trigger the event processing engine 450 to initiate execution of the appropriate model layer 405 functions involved in saving the rule configuration. The event processing engine 450 may further direct the view engine 440 to generate the rule details view 900 (e.g., see FIG. 9), or if appropriate, the envelope configuration view 1100 (e.g., see FIG. 11). Detection by the event detection engine 445 of the selection event associated with the cancel button 1035 may trigger the event processing engine 450 to direct the view engine 440 to generate the rule details view 900.

Figure 11:
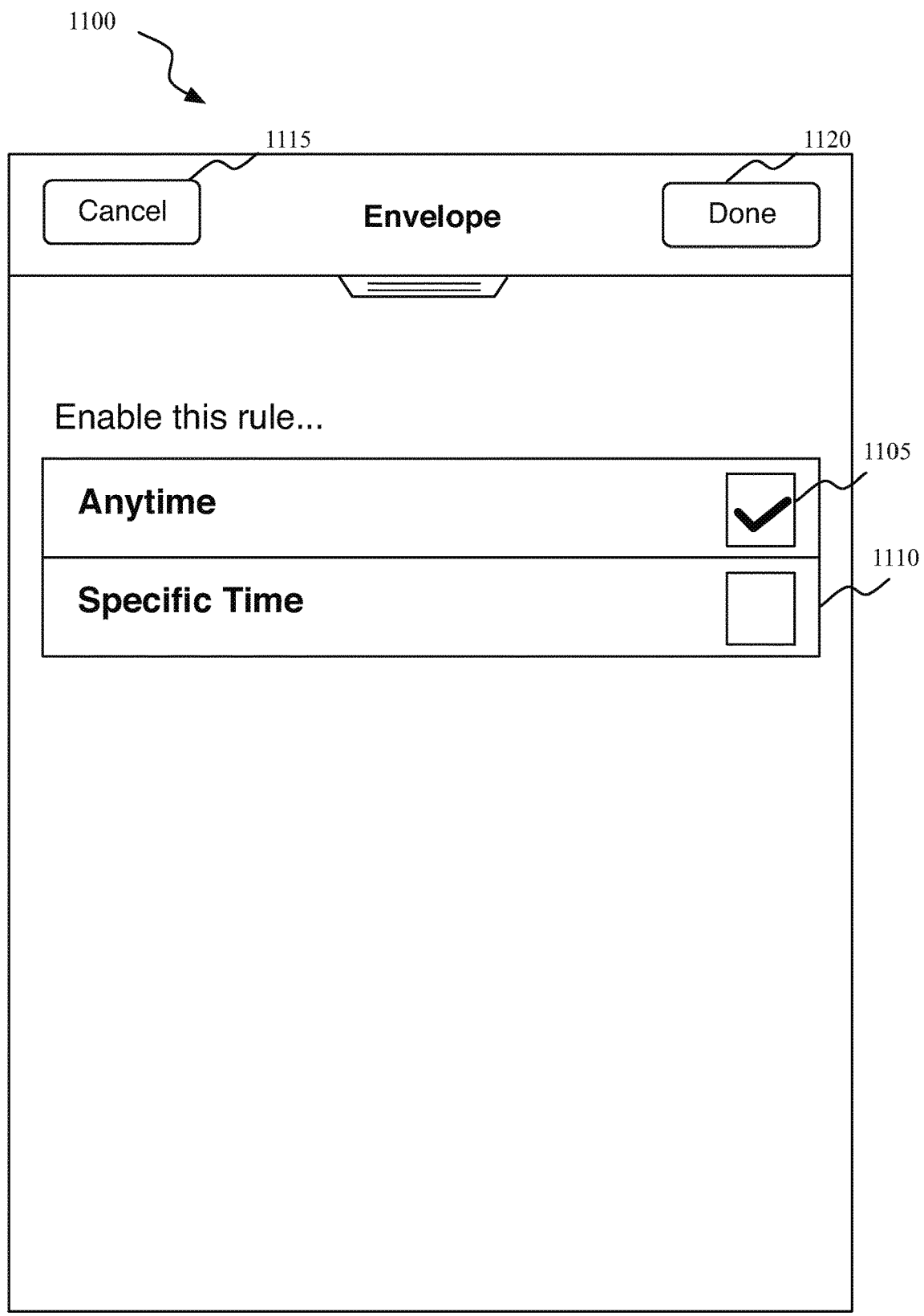
FIG. 11 is a block diagram of an exemplary user interface of an envelope configuration view for a rule item of FIG. 8 displayed on a remote management device of FIG. 1 and FIG. 2.

In certain cases, a configurable rule activation envelope is available to configure the time window when the rule is active and available for triggering the associated device action, system action, notification action, and the like. Referring now to FIG. 11, detection of the selection event associated with the selection of an anytime checkbox 1105 configures an open time envelope where the rule is active at all times. Detection of the selection event associated with the selection of a specific time checkbox 1110 triggers display of an interface for the configuration of a specific activation time envelope (not shown). Detection by the event detection engine 445 (e.g., see FIG. 4) of the selection event associated with the done button 1120 triggers the event processing engine 450 to initiate execution of the appropriate model layer 405 functions involved in saving the envelope configuration. The event processing engine 450 may further direct the view engine 440 to generate the rule details view 900 (e.g., see FIG. 9). Detection by the event detection engine 445 of the selection event associated with the cancel button 1115 triggers the event processing engine 450 to direct the view engine 440 to generate the rule configuration view 1000 (e.g., see FIG. 10).

Figure 12:
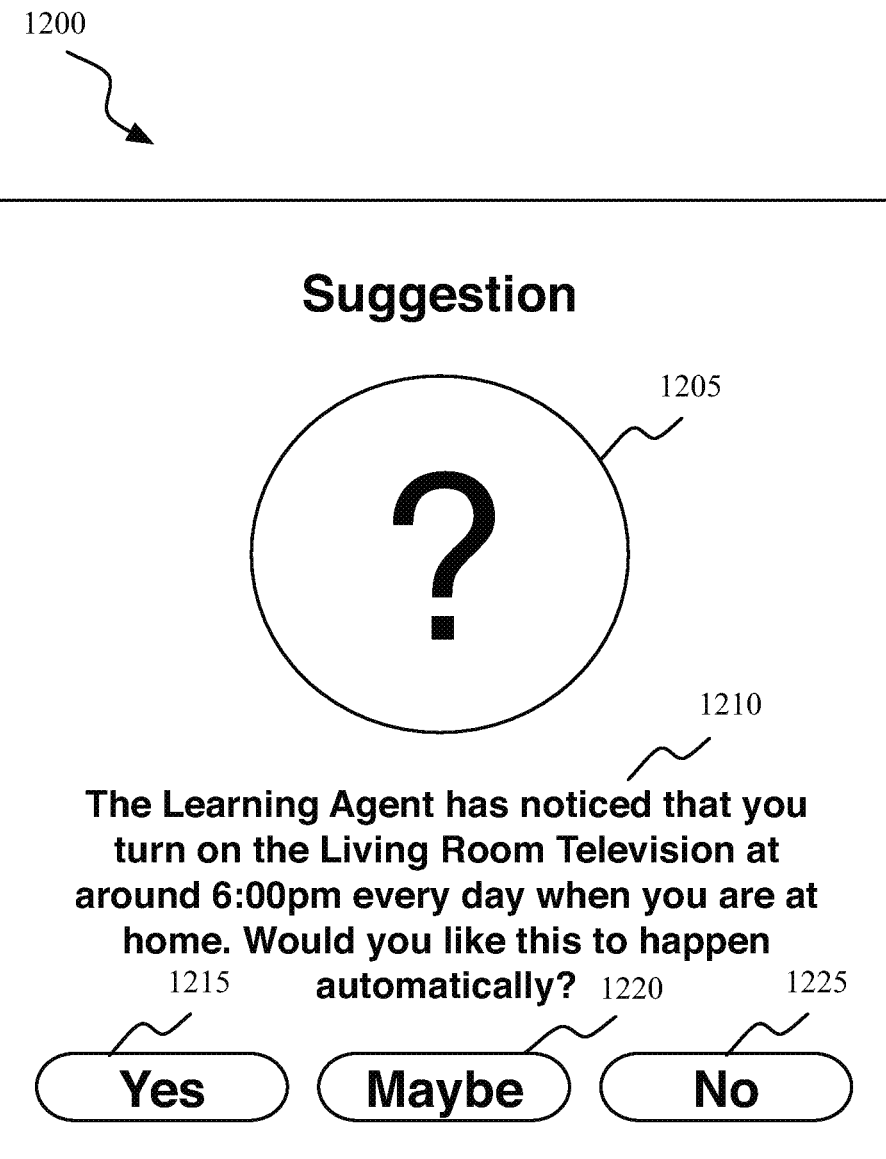
FIG. 12 is a block diagram of an exemplary user interface for a rule suggestion message view displayed on a remote management device of FIG. 1 and FIG. 2.

Referring now to FIG. 12, an exemplary user interface for displaying suggestion message view 1200 may be generated by the view engine 440 (e.g., see FIG. 4). In some instances, the interactive view 1200 may include a message designator 1205, a natural language suggestion describing a suggested rule 1210, and one or more message interaction user interface controls 1215, 1220, 1225. In certain embodiments, detection by the event detection engine 445 of the selection event associated with a yes button 1215 triggers the event processing engine 450 to initiate execution of the appropriate model layer 405 functions involved in accepting the suggested rule and setting the rule to obtain an active state during the configured activation envelope, then dismisses the message view. Detection by the event detection engine 445 of the selection event associated with a no button 1225 triggers the event processing engine 450 to dismiss the message view without a suggested rule acceptance event. Detection by the event detection engine 445 of the selection event associated with a maybe button 1220 triggers the event processing engine 450 to initiate execution of the appropriate model layer 405 functions involved in storing the suggested rule in the rule repository 335 (e.g., see FIG. 3), then dismisses the message view. The suggested rule may then be available for retrieval and future selection in a suggested rule summary listing view (e.g., see FIG. 13).

Figure 13:
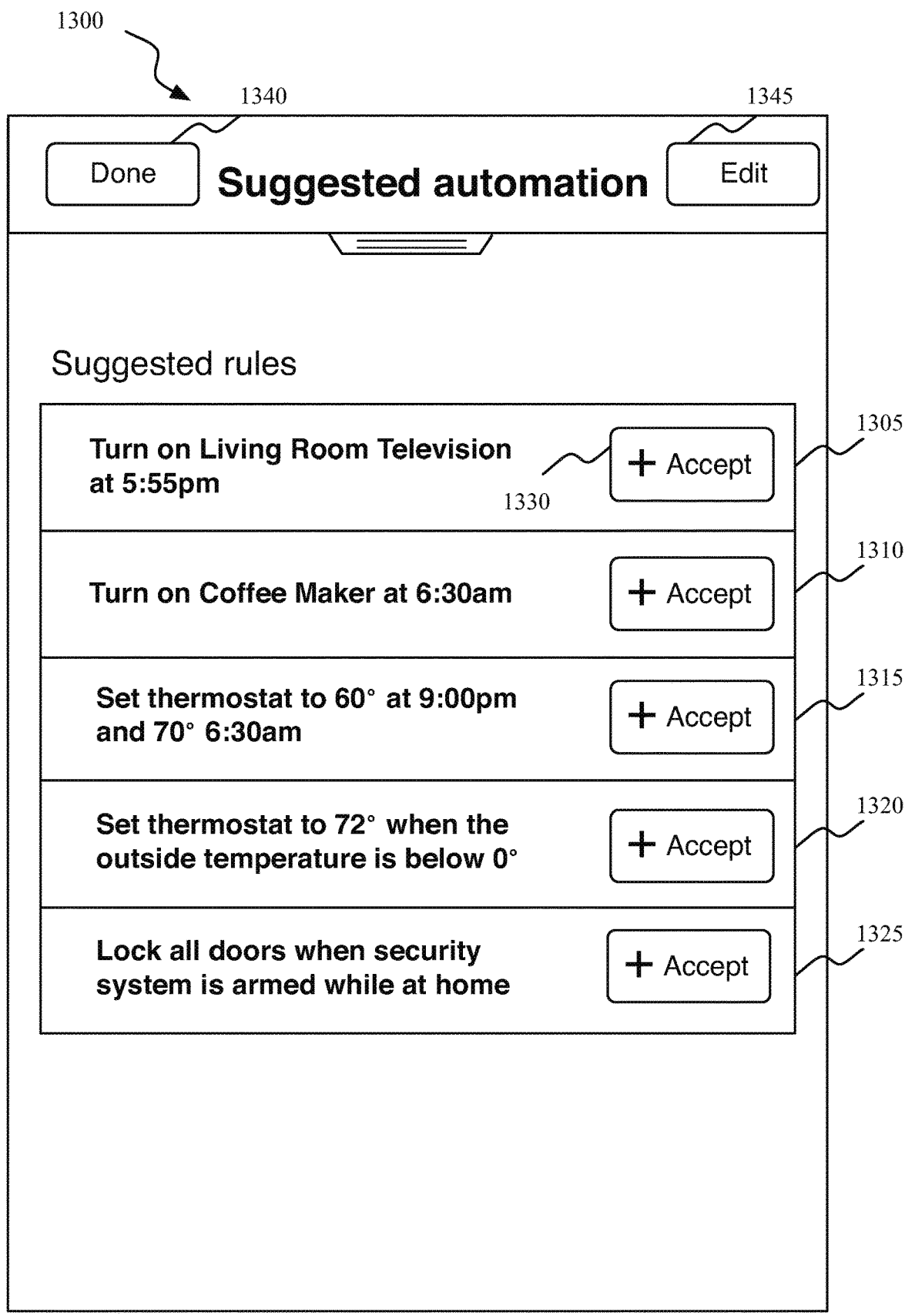
FIG. 13 is a block diagram of an exemplary user interface for a suggested rule summary listing view displayed on a remote management device of FIG. 1 and FIG. 2.

Referring now to FIG. 13, an exemplary user interface for displaying suggested rule summary list view 1300 may be generated by the view engine 440 (e.g., see FIG. 4). In some implementations, the list elements include suggested rules not yet accepted or rejected. Each suggested rule list item 1305, 1310, 1315, 1320, 1325 can include an accept button 1330. Detection by the event detection engine 445 of the click event associated with an accept button can trigger the event processing engine 450 to initiate execution of the appropriate model layer 405 functions involved in accepting the suggested rule, setting the rule to obtain an active state during the configured activation envelope, then removing the associated suggested rule list item from the list view. Detection by the event detection engine 445 of the selection event associated with the done button 1340 triggers the event processing engine 450 to initiate execution of the appropriate model layer 405 functions involved in dismissing the suggested rule list view 1300. Detection by the event detection engine 445 of the selection event associated with the done button 1345 triggers the event processing engine 450 to direct the view engine 440 to generate a delete control for each of the suggested rule list items. Detection by the event detection engine 445 of the selection event associated with a suggested rule list item delete control (not shown) removes the associated suggested rule list item from the suggested summary rule list view.

Figure 14:
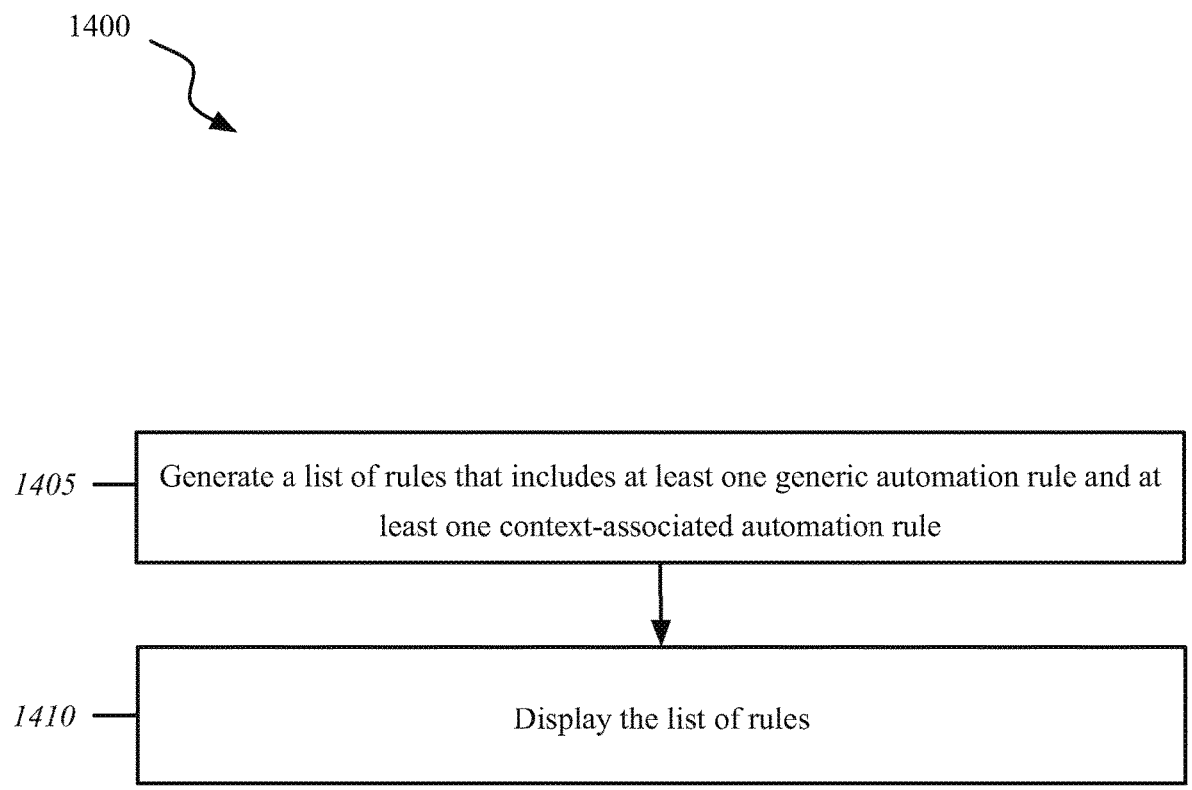
FIG. 14 is a flow diagram illustrating a method for generating and displaying a list of rules according to various embodiments of FIG. 1 and FIG. 2.
Figure 15:
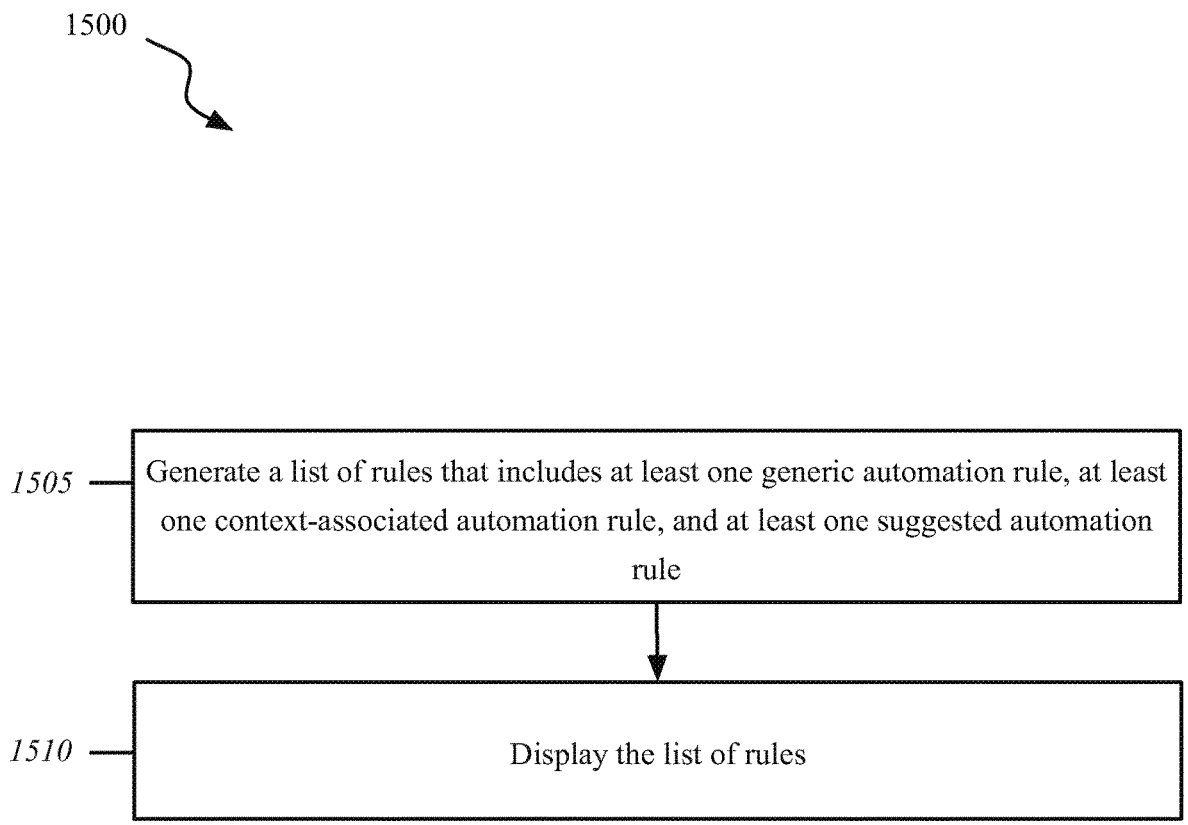
FIG. 15 is a flow diagram illustrating a method for generating and displaying a list of rules that includes a suggested rule according to various embodiments of FIG. 1 and FIG. 2.
Figure 16:
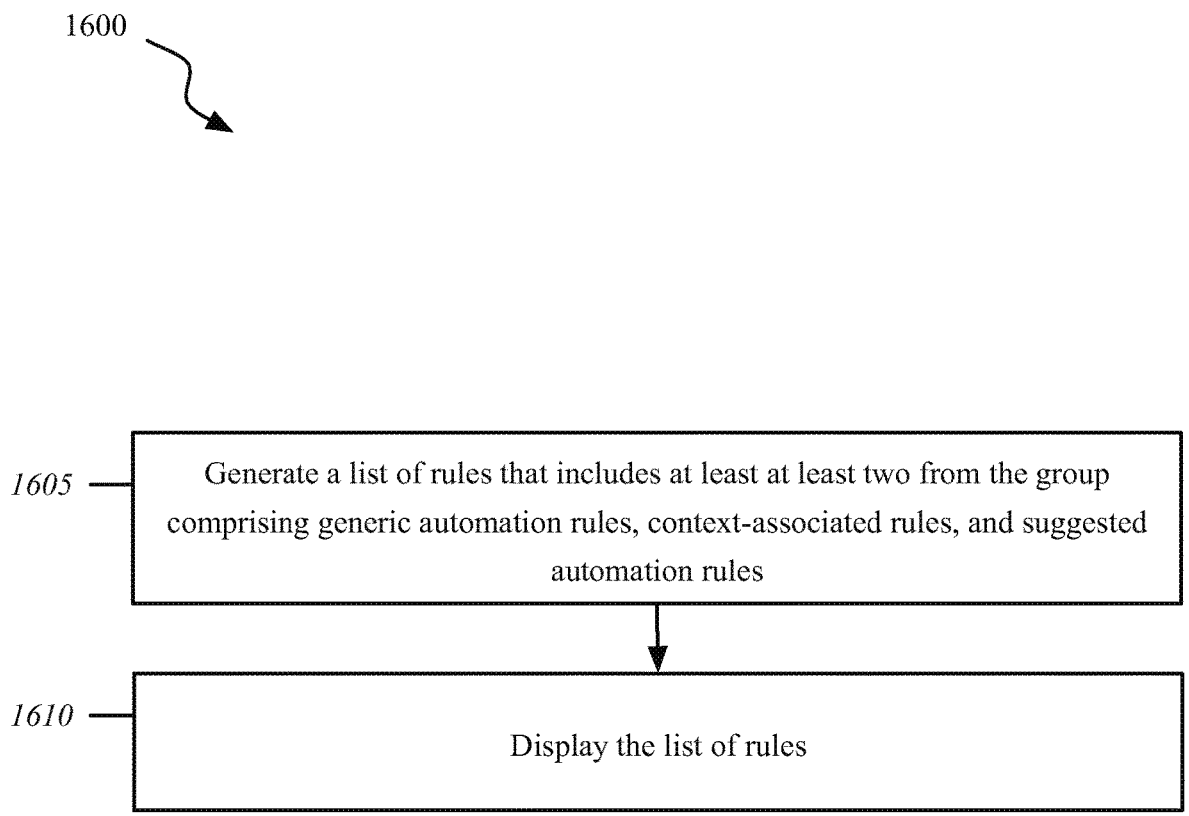
FIG. 16 is a flow diagram illustrating a method for generating and displaying a list of rules of different types according to various embodiments of FIG. 1 and FIG. 2.

Referring now to FIG. 14 through FIG. 16, a series of flowcharts illustrating methods 1400, 1500, 1600 for generating and displaying a list of rules is shown in accordance with various embodiments. Methods 1400, 1500, and 1600 may be carried out by a device in a home automation system and may, for example, be performed by a computing device 150, a control device 122, a service provider device 110, a remote management device 105, or a web service 210 of FIG. 1 and FIG. 2, or using any combination of the devices described for these figures. With reference to FIG. 14, initially, at block 1405, the system may generate a list of rules that includes at least one generic automation rule and at least one context-associated automation rule. In some embodiments, these rules are retrieved from a local data store such as a rules repository 335 or device data store 131, retrieved from a remote data store such as web service data store 225 or a service provider data store 160, or retrieved from some combination of data stores. The list may be generated before transmission to the display device, or the parsing engine 420 of a display device may parse a superset of rules and generate the list of rules for display. At block 1410, a presentation module, such as view engine 440, may receive the rule list and display the list of rules. The list of rules may include one or more interactive list items for navigating rule details, editing rules, activating rules, and the like.

Referring now to FIG. 15, at block 1505, the list of rules generated may include at least one suggested rule in addition to the one or more generic automation rules and the one or more context-associated automation rules. Alternatively, with reference to FIG. 16, at block 1605, the generated list of rules may include at least two rules from the group of rules including generic automation rules, context-associated rules, and suggested automation rules. In some embodiments, the suggested automation rule is a learned rule generated by the learning module 320 (e.g. see FIG. 3). In certain implementations, the generated list of rules may also include notification rules.

Figure 17:
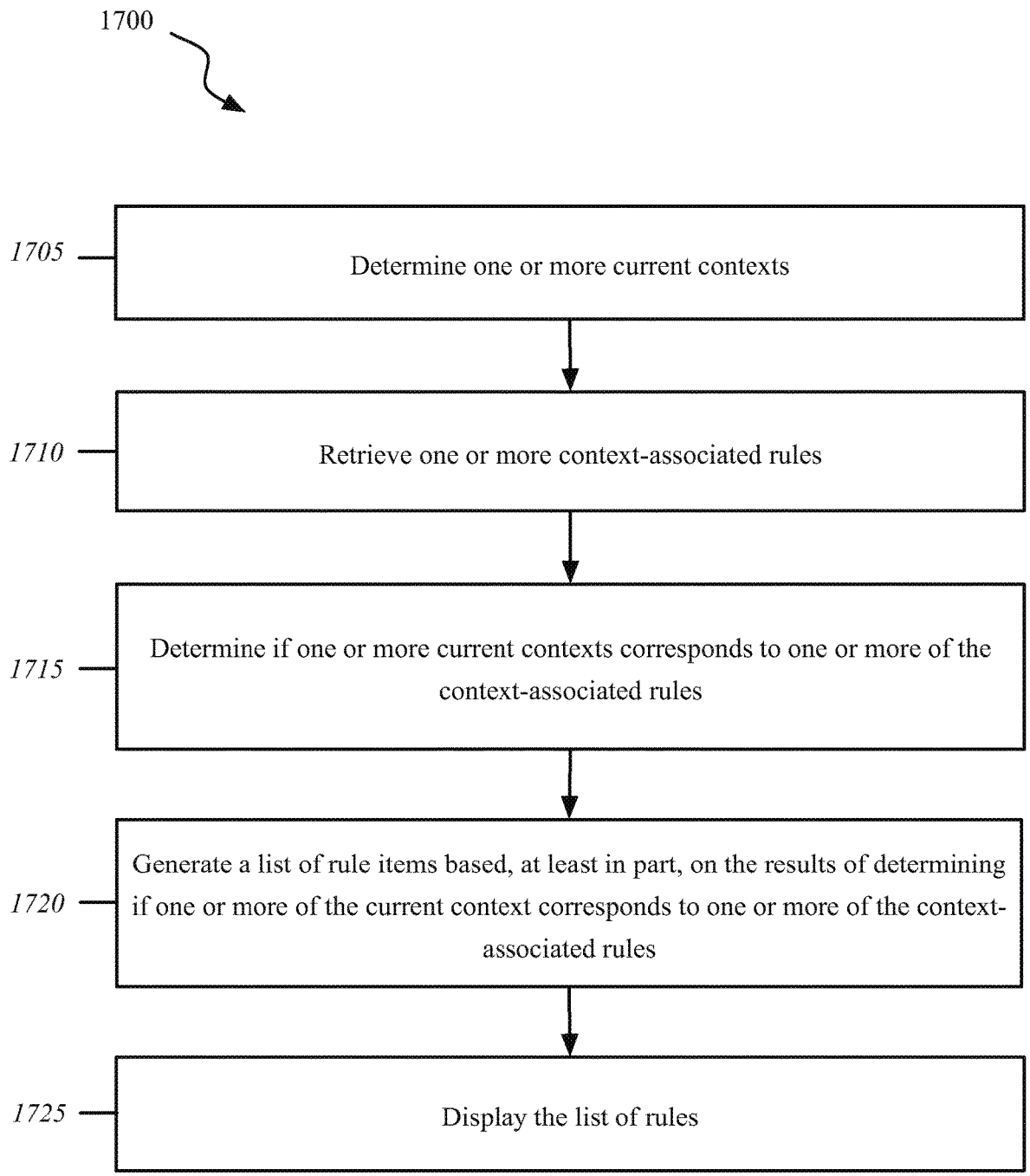
FIG. 17 is a flow diagram illustrating a method generating and displaying a list of rules that includes a context-associated rule according to various embodiments of FIG. 1 and FIG. 2.

Referring now to FIG. 17, a flowchart illustrating a method 1700 for generating and displaying a list of rules that includes a context-associated rule is shown in accordance with various embodiments. Method 1700 may be carried out by a device in a home automation system and may, for example, be performed by a computing device 150, a control device 122, a service provider device 110, a remote management device 105, or a web service 210 of FIG. 1 and FIG. 2, or using any combination of the devices described for these figures.

At block 1705, in some embodiments, context module 310 (e.g., see FIG. 3) determines one or more current contexts. Contexts may include, for example, property contexts, external condition contexts, or both. Further, property contexts may include, for example, a location context, a graduated utility rate context, and the like. External condition contexts may include, for example, a weather context, a criminal activity context, and the like. In some implementations, contexts may be determined by a detection engine 312.

At block 1710, one or more context-associated rules are retrieved from memory. In some embodiments, rule retrieval is performed by rules module 315 (e.g., see FIG. 3). Memory may be a local integrated device memory, external connected memory, and/or a memory coupled to another computer device. The retrieved set of context-associated rules may be specific to a property, a system, or both.

At block 1715, the current contexts determined by the detection engine 312 are compared against each context-associated rule in the obtained by the retrieving step 1710 and a determination is made for each context associated rule whether that rule corresponds to one or more of the current contexts detected in the determining step 1705.

At block 1720, in some instances, if the results of the determining step of block 1715 indicates that one or more retrieved context-associated rules corresponds to a current context, a component of an application module, such as the rules module 315 of application module 172-a, generates a list of rule items based, at least in part, on the results of determining step 1715. The parsing engine 420 (e.g., see FIG. 4) may pass the list of rule items to the view engine 440 to populate the list elements of a presentation view. At block 1725, a computing device with a graphical display may display the list of items in the view generated by the view engine 440.

Figure 18:
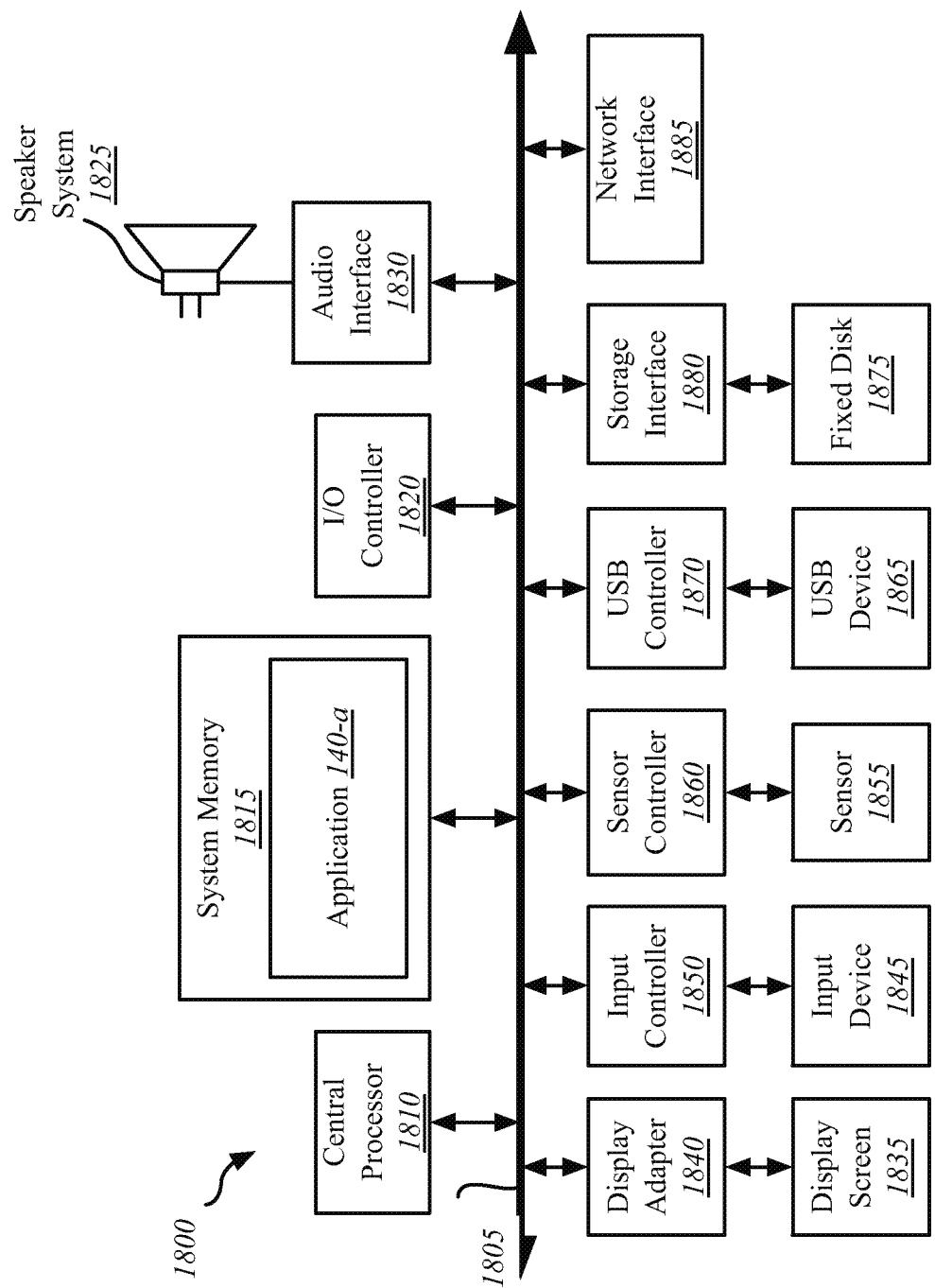
FIG. 18 is a block diagram of a computer system suitable for implementing the present systems and methods of FIG. 1 and FIG. 2.

FIG. 18 depicts a block diagram of a controller 1800 suitable for implementing the present systems and methods. The controller 1800 may be an example of remote management device 105, computing device 150, and/or home automation controller 155 illustrated in FIG. 1. In one configuration, controller 1800 includes a bus 1805 which interconnects major subsystems of controller 1800, such as a central processor 1815, a system memory 1820 (typically RAM, but which may also include ROM, flash RAM, or the like), an input/output controller 1825, an external audio device, such as a speaker system 1830 via an audio output interface 1835, an external device, such as a display screen 1835 via display adapter 1840, an input device 1845 (e.g., remote control device interfaced with an input controller 1850), multiple USB devices 1865 (interfaced with a USB controller 1870), and a storage interface 1880. Also included are at least one sensor 1855 connected to bus 1805 through a sensor controller 1860 and a network interface 1885 (coupled directly to bus 1805).

Bus 1805 allows data communication between central processor 1815 and system memory 1820, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications (e.g., application 140) resident with controller 1800 are generally stored on and accessed via a non-transitory computer readable medium, such as a hard disk drive (e.g., fixed disk 1875) or other storage medium. Additionally, applications may be in the form of electronic signals modulated in accordance with the application and data communication technology when accessed via interface 1885.

Storage interface 1880, as with the other storage interfaces of controller 1800, may connect to a standard computer readable medium for storage and/or retrieval of information, such as a fixed disk drive 1875. Fixed disk drive 1875 may be a part of controller 1800 or may be separate and accessed through other interface systems. Network interface 1885 may provide a direct connection to a remote server via a direct network link to the Internet via a POP (point of presence). Network interface 1885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1800 wirelessly via network interface 1885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 18 need not be present to practice the present systems and methods. The devices and subsystems may be interconnected in different ways from that shown in FIG. 18. The aspect of some operations of a system such as that shown in FIG. 18 are readily known in the art and are not discussed in detail in this application. Computer instructions to implement the present disclosure may be stored in a non-transitory computer-readable medium such as one or more of system memory 1820 or fixed disk 1875. The operating system provided on controller 1800 may be, for example, iOS®, ANDROID®, MS-DOS®, MS-WINDOWS®, OS/2®, UNIX®, LINUX®, OSX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A home automation control device, comprising:
a display;
memory associated with the display;
one or more processors configured to execute one or more programs stored in the memory;
a context template configured to store one or more context associated rules;
a context configuration that controls an availability, an execution, or both of the at least one context-associated rule based on an existence of an alert, the context configuration based at least in part on a location context of a home automation system; and
a graphical user interface produced by an application program operating on the home automation control device, the graphical user interface configured to detect at least one selection event associated with at least one remote device of the home automation system and generate, on the display:
a list of displayed rule types, including: a generic rule type, a context-associated rule type, a suggested rule type, a notification rule type, and a custom rule type; and
a plurality of rule item lists associated with the at least one remote device of the home automation system, each rule item list comprising one or more home automation rules displayed as rule items, with at least one rule item lists comprising a plurality of rule items, each rule item list categorized into and displayed together with a respective one of the plurality of displayed rule types, and each rule item comprising a toggle element for activating or deactivating the rule item's home automation rule, wherein:
the home automation rules for the rule item list categorized into the generic rule type are each associated with at least one component of the home automation system;

the rule items categorized into the context-associated rule type include a rule item for the at least one context-associated home automation rule, wherein the at least one context-associated home automation rule is based at least in part on the location context of the home automation system and is triggered when the alert is detected;

the rule items categorized into the suggested rule type include at least one rule item whose toggle element and home automation rule has been automatically activated by the home automation system based at least in part on a series of two or more events associated with the home automation system the accepted rule item comprising a natural language description of the activated rule item's home automation rule;

the home automation rules for the rule items categorized into the notification rule type each generate a notification based at least in part on an event detected by one of the remote devices associated with the home automation system;

the home automation rules for the rule items categorized into the custom rule type are generated based at least in part on input received at the at least one remote device of the home automation system; and a feature controller configured to control the at least one remote device based on a selection of the at least one of the plurality of displayed home automation rules.

2. The home automation control device of claim 1, wherein the suggested home automation rule comprises a learned automation rule.

3. The home automation control device of claim 1, wherein at least one context-associated home automation rule is further associated with a property context.

4. The home automation control device of claim 3, wherein the property context is a property location.

5. The home automation control device of claim 1, comprising a computing device that is a portable electronic device with a touch screen display.

6. The home automation control device of claim 1, wherein at least one context-associated automation rule is further associated with an external condition context.

7. A computer-implemented method for home automation, the method comprising:
  generating a plurality of rule item lists associated with at least one remote device of a home automation system, the plurality of rule item lists comprising
    a generic rule item list with at least one rule item associated with a selectable generic automation rule that is associated with at least one component of the home automation system,
    a context-associated rule item list with at least one rule item associated with a selectable context-associated automation rule that is based at least in part on a location context of the home automation system,
    a suggested rule item list with at least one rule item associated with a suggested rule that has been automatically activated by the home automation system based at least in part on a series of two or more events associated with the home automation system and comprising natural language describing the suggested rule,
    a notification rule list with at least one rule item associated with a notification rule that generates a notification based at least in part on a condition of the home automation system, and
    a custom rule list with at least one rule item associated with a custom rule, the custom rule based at least in part on input received at the at least one remote device of the home automation system, displaying the plurality of rule item lists, each rule item list displayed together with a respective label describing a category for the rule item list, each rule item comprising a toggle element for activating or deactivating the rule item;

controlling an availability, an execution, or both of the context-associated rule items based on a context configuration based on an existence of an alert, the context configuration based at least in part on the location context of the home automation system; and controlling the at least one remote device based on the toggle element and the selectable context-associated automation rule.

8. The computer-implemented method of claim 7, further comprising:
  determining one or more current contexts;
  retrieving a pre-defined list of context-associated rules from a memory;
  determining if the one or more current contexts correspond to one or more of the context-associated rules in the pre-defined list of context-associated rules; and
  generating the context-associated rule item list of based, at least in part, on the results of determining if the one or more current contexts correspond to one or more of the context-associated rules in the pre-defined list of context-associated rules.

9. The computer-implemented method of claim 8, wherein at least one context-associated rule is further associated with an external condition context.

10. The computer-implemented method of claim 8, wherein at least one context-associated rule is further associated with a property context.

11. The computer-implemented method of claim 10, wherein at least one of the one or more current contexts comprises a property location.

12. The computer-implemented method of claim 7, wherein the suggested automation rule further comprises a learned automation rule.

13. A computer program product for a rule-based automation and notification system, comprising:
  a non-transitory computer-readable medium comprising:
  code for generating a plurality of rule item lists associated with a plurality of devices of a home automation system, the plurality of rule item lists comprising
    a generic rule item list with at least one rule item associated with a selectable generic automation rule that is associated with at least one component of the home automation system,
    a suggested rule item list with at least one rule item associated with a suggested rule that has been automatically activated by the home automation system based at least in part on a series of two or more events associated with the home automation system and and comprising natural language describing the suggested rule,
    a notification rule list with at least one rule item associated with a notification rule that generates a notification based at least in part on a condition of the home automation system,
    a context-associated rule item list with at least one rule item associated with a selectable context-associated automation rule that is based at least in part on a location context of the home automation system, and a custom rule list with at least one rule item associated with a custom rule, the custom rule based at least in part on input received at at least one remote device of the home automation system, code for displaying the plurality of rule item lists, each rule item list displayed together with a respective label describing a category for the rule item list, each rule item comprising a toggle mechanism for activating or deactivating the rule item;

code for controlling an availability, an execution, or both, of the context-associated rule items based on a context configuration based on an existence of an alert, the context configuration based at least in part on a location context of the home automation system; and code for controlling at least one of the plurality of devices based on a selection of each toggle element for the one or more automation rule items.

14. The computer program product of claim 13, wherein at least one suggested rule is a learned automation rule.

15. The computer program product of claim 13, wherein the notification for at least one notification rule is a push notification.

16. The computer program product of claim 13, wherein at least one context-associated rule item is further associated with a property context.

17. The computer program product of claim 13, wherein at least one context-associated rule item is further associated with an external condition context.

18. A rule-based automation and notification system comprising:

means for generating a plurality of rule item lists comprising a generic rule item list with at least one rule item associated with a selectable generic automation rule that is associated with at least one component of the home automation system, a suggested rule item list with at least one rule item associated with a suggested rule that has been automatically activated by the home automation system, based at least in part on a series of two or more events associated with the home automation system and and comprising natural language describing the suggested rule, a notification rule list with at least one rule item associated with a notification rule that generates a notification based at least in part on a condition of the home automation system, a context-associated rule item list with at least one rule item associated with a selectable context-associated automation rule that is based at least in part on a location context of the home automation system, and a custom rule list with at least one rule item associated with a custom rule, the custom rule based at least in part on input received at at least one remote device of the home automation system, means for displaying the plurality of rule item lists, each rule item list displayed together with a respective label describing a category for the rule item list, each rule item comprising a toggle mechanism for activating or deactivating the rule item;

means for controlling an availability, an execution, or both, of the context-associated rule items based on a context configuration based on an existence of an alert, the context configuration based at least in part on a location context of the home automation system; and means for controlling a remote device of the home automation system based on a selection of each toggle element for at least one of the rule items associated with the home automation system.

* * * * *